United States Patent
Wright et al.

(10) Patent No.: US 12,217,254 B2
(45) Date of Patent: Feb. 4, 2025

(54) METHOD AND SYSTEM FOR CONTROLLING THE PERFORMANCE OF A CONTRACT USING A DISTRIBUTED HASH TABLE AND A PEER-TO-PEER DISTRIBUTED LEDGER

(71) Applicant: nChain Holdings Limited, St. John's (AG)

(72) Inventors: Craig Steven Wright, London (GB); Stephane Savanah, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 16/097,222

(22) PCT Filed: Apr. 28, 2017

(86) PCT No.: PCT/IB2017/052463
§ 371 (c)(1),
(2) Date: Oct. 26, 2018

(87) PCT Pub. No.: WO2017/187395
PCT Pub. Date: Nov. 2, 2017

(65) Prior Publication Data
US 2019/0095909 A1    Mar. 28, 2019

(30) Foreign Application Priority Data
Apr. 29, 2016    (GB) ...................... 1607477

(51) Int. Cl.
    *G06Q 20/38*       (2012.01)
    *G06F 21/00*       (2013.01)
    (Continued)

(52) U.S. Cl.
    CPC ........... *G06Q 20/389* (2013.01); *G06F 21/00* (2013.01); *G06Q 20/02* (2013.01); *G06Q 20/065* (2013.01);
    (Continued)

(58) Field of Classification Search
CPC .... G06F 16/2228; G06F 16/313; G06F 21/00; G06F 21/602; G06F 21/10; G06F 20/02;
(Continued)

(56) References Cited

U.S. PATENT DOCUMENTS

| | | |
|---|---|---|
| RE38,451 E | 3/2004 | Veenstra |
| 9,063,978 B1 | 6/2015 | Kapoor et al. |

(Continued)

FOREIGN PATENT DOCUMENTS

| | | |
|---|---|---|
| EP | 3125489 A1 | 2/2017 |
| FR | 3018379 A1 | 9/2015 |

(Continued)

OTHER PUBLICATIONS

Herbert, "novel method for decentralised peer-to-peer software license validation using cryptocurrency blockchain technology", 2015 (Year: 2015).*

(Continued)

*Primary Examiner* — Steven S Kim
*Assistant Examiner* — Jason B Fenstermacher
(74) *Attorney, Agent, or Firm* — Tarolli, Sundheim, Covell & Tummino LLP

(57) ABSTRACT

A computer-implemented method (100) and system (1) for controlling the performance of a smart contract. The method includes storing a contract on or in a computer-based repository. The contract is associated with a licence between a first user (U1) and a second user (U2). The method further includes receiving, over a communications network, a transaction comprising a transfer of a token from an agent (A) to the first user (U1) or the second user (U2). The transaction comprises metadata that includes an identifier indicative of a location where the contract is stored. The method further includes querying a peer-to-peer distributed ledger (i.e. blockchain) to determine whether the transaction comprises (Continued)

at least one unspent output (UTXO). The method further includes, responsive to querying the peer-to-peer distributed ledger, determining whether to modify performance of the contract. The blockchain may be the Bitcoin blockchain.

15 Claims, 7 Drawing Sheets

(51) Int. Cl.
    *G06Q 20/02*     (2012.01)
    *G06Q 20/06*     (2012.01)
    *G06Q 20/36*     (2012.01)
    *H04L 9/06*     (2006.01)
    *H04L 9/30*     (2006.01)
    *H04L 9/32*     (2006.01)

(52) U.S. Cl.
    CPC ..... *G06Q 20/3678* (2013.01); *G06Q 20/3827* (2013.01); *G06Q 20/3829* (2013.01); *H04L 9/0643* (2013.01); *H04L 9/30* (2013.01); *H04L 9/3247* (2013.01); *H04L 9/3252* (2013.01); *G06F 2221/2145* (2013.01); *G06Q 2220/00* (2013.01); *H04L 2209/56* (2013.01)

(58) Field of Classification Search
    CPC ...... G06F 20/65; G06Q 20/02; G06Q 20/065; G06Q 20/3678; G06Q 20/389; G06Q 20/3829; G06Q 20/3827; G06Q 2220/00; G06Q 20/367; G06Q 20/385; H04L 9/3247; H04L 9/0643; H04L 9/30; H04L 9/3252; H04L 2209/56
    See application file for complete search history.

(56) References Cited

U.S. PATENT DOCUMENTS

| | | | |
|---|---|---|---|
| 9,933,760 | B2 | 4/2018 | Bonnat |
| 10,050,779 | B2 | 8/2018 | Alness et al. |
| 10,523,443 | B1 | 12/2019 | Kleinman |
| 11,341,484 | B2 | 5/2022 | Wright et al. |
| 2004/0015496 | A1 | 1/2004 | Anonsen |
| 2004/0215650 | A1 | 10/2004 | Shaji et al. |
| 2005/0120133 | A1* | 6/2005 | Slack-Smith ....... G06F 12/0862 709/201 |
| 2005/0188085 | A1* | 8/2005 | Lin ....................... H04L 67/104 709/225 |
| 2007/0013967 | A1* | 1/2007 | Ebaugh ................ G06V 30/414 707/E17.084 |
| 2007/0136155 | A1 | 6/2007 | Chape et al. |
| 2008/0126065 | A1 | 5/2008 | Nicholas |
| 2010/0058477 | A1 | 3/2010 | Ciet et al. |
| 2011/0113238 | A1* | 5/2011 | Jennings ............. H04L 63/0823 713/156 |
| 2011/0218891 | A1 | 9/2011 | Sjelvgren et al. |
| 2013/0197752 | A1 | 8/2013 | Planche et al. |
| 2015/0074159 | A1 | 3/2015 | Poschmann et al. |
| 2015/0120567 | A1* | 4/2015 | Van Rooyen ........... G06F 21/10 705/59 |
| 2015/0163992 | A1* | 6/2015 | Anderson ............ A01C 21/005 701/50 |
| 2015/0206106 | A1* | 7/2015 | Yago .................. G06Q 20/0655 705/68 |
| 2015/0269570 | A1 | 9/2015 | Phan et al. |
| 2015/0278820 | A1 | 10/2015 | Meadows |
| 2015/0324764 | A1 | 11/2015 | Van Rooyen et al. |
| 2015/0332283 | A1 | 11/2015 | Witchey |
| 2015/0379510 | A1 | 12/2015 | Smith |
| 2016/0085955 | A1 | 3/2016 | Lerner |
| 2016/0086175 | A1 | 3/2016 | Finlow-Bates et al. |
| 2016/0098723 | A1 | 4/2016 | Feeney |
| 2016/0134431 | A1 | 5/2016 | Ebrom et al. |
| 2016/0217436 | A1 | 7/2016 | Brama |
| 2016/0269182 | A1 | 9/2016 | Sriram et al. |
| 2016/0292672 | A1 | 10/2016 | Fay et al. |
| 2016/0330031 | A1 | 11/2016 | Drego et al. |
| 2016/0358267 | A1 | 12/2016 | Arjomand |
| 2017/0034197 | A1 | 2/2017 | Daniel et al. |
| 2017/0091750 | A1 | 3/2017 | Maim |
| 2017/0109748 | A1 | 4/2017 | Kote |
| 2017/0140408 | A1 | 5/2017 | Wuehler |
| 2017/0154193 | A1 | 6/2017 | Leiserson et al. |
| 2017/0178417 | A1 | 6/2017 | Bekas et al. |
| 2017/0212781 | A1 | 7/2017 | Dillenberger et al. |
| 2017/0220815 | A1 | 8/2017 | Ansari et al. |
| 2017/0220998 | A1 | 8/2017 | Horn et al. |
| 2017/0243193 | A1 | 8/2017 | Manian et al. |
| 2017/0243212 | A1 | 8/2017 | Castinado et al. |
| 2017/0244707 | A1 | 8/2017 | Johnsrud et al. |
| 2017/0270527 | A1 | 9/2017 | Rampton |
| 2017/0279774 | A1 | 9/2017 | Booz et al. |
| 2017/0287068 | A1 | 10/2017 | Nugent |
| 2017/0287090 | A1 | 10/2017 | Hunn et al. |
| 2018/0167217 | A1 | 6/2018 | Brady et al. |
| 2018/0253702 | A1 | 9/2018 | Dowding |
| 2019/0179801 | A1 | 6/2019 | Jang et al. |
| 2020/0358812 | A1* | 11/2020 | Xiao ................... H04L 63/1441 |

FOREIGN PATENT DOCUMENTS

| | | |
|---|---|---|
| GB | 201413284 | 9/2014 |
| GB | 201416822 | 11/2014 |
| GB | 2514716 A | 12/2014 |
| GB | 201605154 | 5/2016 |
| GB | 2540975 A | 2/2017 |
| WO | 2015144971 A1 | 10/2015 |

OTHER PUBLICATIONS

Antonopolous, "masteering bitcoin", 2014 (Year: 2014).*
Tom Harding, "How do bitcoin miners check for double-spend or over-spend?" May 25, 2015. (Year: 2015).*
Nakamoto, "Bitcoin: A Peer-to-Peer Electronic Cash System," Bitcoin, Oct. 31, 2008, https://bitcoin.org/bitcoin. pdf, 9 pages.
Ibáñez et al., "Attaching Semantic Metadata to Cryptocurrency Transactions," University of Southampton, Jul. 28, 2017, 16 pages.
Alam et al., "Bitcoin for smart trading in smart grid," The 21st IEEE International Workshop on Local and Metropolitan Area Networks, Apr. 22, 2015, 2 pages.
Allison, "Ethereum-based Slock.it reveals first ever lock opened with money," International Business Times, Dec. 17, 2015 [retrieved Jul. 20, 2020], https://www.ibtimes.co.uk/ethereum-based-slock-reveals-first-ever-lock-opened-money-1527014, 3 pages.
Andrychowicz et al., "Secure Multiparty Computations on Bitcoin," IEEE Symposium on Security and Privacy, May 1, 2014, 18 pages.
Anonymous, "Distributed Hash Tables and Consistent Hashing," CloudFundoo, https://cloudfundoo.wordpress.com/2012/05/28/distributed-hash-tables-and-consistent-hashing, May 28, 2012, 7 pages.
Anonymous, "Universal Blockchained Health Record," The IP.com Journal, Apr. 13, 2016, 3 pages.
Anonymous, "What is Ethereum?," EtherScripter, https://web.archive.org/web/20160329151319/http://etherscripter.com/what_is_ethereum.html, archived Mar. 29, 2016 [retrieved Feb. 21, 2019], 4 pages.
Bertani, "Fehu: E-commerce and security, on the same page," Fehu Labs, Apr. 19, 2016, 22 pages.
Bertani, "Oraclize: App Beta; Use case-driven approach; Overview," Oraclize, http://docs.oraclize.it, http://app.praclize.it/contracts/create, and https://blog.oraclize.it/use-case-driven-approach-a54b1fcbd2d2#jxot32mxq, copyright 2016 [retrieved Nov. 2, 2016], 15 pages.
Bitcoinwiki, "Script," Creative Commons Attribution 3.0, Jul. 28, 2012.
Bluematt et al., "Chat Logs Sep. 28, 2014," Bitcoin Wizards IRC Channel, https://download.wpsoftware.net/bitcoin/wizards/2014-09-28.html, Sep. 28, 2014, 4 pages.

(56) References Cited

OTHER PUBLICATIONS

Buterin, "Ethereum and Oracles," Ethereum Blog, Jul. 22, 2014 [retrieved Feb. 5, 2018], https://blog.ethereum.org/2014/07/22/ethereum-and-oracles/, 16 pages.
Buterin, "Privacy on the Blockchain," Ethereum Blog, Jan. 15, 2016 (retreived Jul. 20, 2020), https://blog.ethereum.org/2016/01/15/privacy-on-the-blockchain/, 14 pages.
Capodieci et al., "I need some phasing aka smart contract material," Nxt Forum, Apr. 27, 2015 [retrieved Apr. 4, 2017], https://nxtforum.org/general-discussion/i-need-some-phasing-aka-smart-contract-material, 9 pages.
Cassano, "What are Smart Contracts? Cryptocurrency's Killer App," Fast Company, https://www.fastcompany.com/3035723/smart-contracts-could-be-cryptocurrencys-killer-app, Sep. 17, 2014 [retrieved Feb. 27, 2019], 7 pages.
Counterparty, "Documentation," Counterparty, https://counterparty.io/docs/, copyright 2014 [retrieved Sep. 20, 2016], 2 pages.
EITC Holdings Limited, "Universal tokenisation system for blockchain based cryptocurrencies," United Kingdom Patent Application No. 1603125.4, Feb. 23, 2016, 1 page.
Garzik et al., "Tweet May 30, 2014," Twitter, https://twitter.com/jgarzik/status/472574342514368512, May 30, 2014 [retrieved Mar. 14, 2019], 1 page.
Garzik, "'Master key multi-sig' protocol, where the N of M threshold idea is used but a specific 'master' key must be present. 'T+M of N' So you can give others multi-sig keys but they can't collude behind your back," Reddit, May 13, 2015 [retrieved Nov. 2, 2016], https://www.reddit.com/r/Bitcoin/comments/35wjai/master_key_multisig_protocol_where_the_n_of_m/, 4 pages.
Garzik, "[Bitcoin-development] Pay to MultiScript hash:," Linux Foundation, https://lists.linuxfoundation.org/pipermail/bitcoin-dev/2014-July/006276.html, Jul. 17, 2014, 1 page.
Garzik, "[Bitcoin-development] Presenting a BIP for Shamir's Secret Sharing of Bitcoin private keys," Linux Foundation, https://lists.linuxfoundation.org/pipermail/bitcoin-dev/2014-March/004908.html, Mar. 29, 2014, 1 page.
Geremia et al., "Multisignature," Bitcoin Wiki, Jan. 5, 2016 revision (first disclosed Mar. 8, 2015) [retrieved Jul. 20, 2020], https://en.bitcoin.it/w/index.php?title=Multisignature&oldid=59815, 3 pages.
Godislove et al., "Thoughts on M of N systems (competing and heirarchically nested)," Bitcoin Forum, Jun. 20, 2014 [retrieved Apr. 4, 2017], https://bitcointalk.org/index.php?topic=659131.msg7433669#msg7433669, 8 pages.
Greenspan, "Beware the impossible smart contract," Linkedin, https://www.linkedin.com/pulse/beware-impossible-smart-contract-gideon-greenspan, Apr. 12, 2016 [retrieved Feb. 27, 2019], 8 pages.
Hearn, "Distributed markets," Bitcoin Wiki, https://en.bitcoin.it/wiki/Distributed_markets, Jul. 11, 2015 [retrieved Sep. 20, 2016], 5 pages.
International Search Report and Written Opinion mailed Jul. 14, 2017, Patent Application No. PCT/IB2017/052466, 11 pages.
International Search Report and Written Opinion mailed Jul. 14, 2017, Patent Application No. PCT/IB2017/052467, 11 pages.
International Search Report and Written Opinion mailed Jul. 18, 2017, Patent Application No. PCT/IB2017/052464, 10 pages.
International Search Report and Written Opinion mailed Jul. 7, 2017, Patent Application No. PCT/IB2017/052463, 11 pages.
Justanotheruser et al., "Chat Log Jan. 9-10, 2014," Bitcoin Wizards IRC Channel, https://download.wpsoftware.net/bitcoin/wizards/2014/01/14-01-09.log, Jan. 9, 2014, 11 pages.
Kiviat, "Beyond Bitcoin: Issues in Regulating Blockchain Transactions," Duke Law Journal 65(3):569-608, Dec. 2015.
Liang et al., "White Paper," GitHub, https://github.com/ethereum/wiki/wiki/white-paper/5f59d858bf36d6f2f6650f1f30f0b8b015741d73, Apr. 13, 2016 [retrieved Feb. 27, 2019], 37 pages.
Markjoingwar et al., "So can you make a complex script and put it into a P2SH address, and it doesn't have to be one of the standard transaction types right? Doesn't this mean Bitcoin can be Turing complete in some cases?," Redditr/bitcoin, https://www.reddit.com/r/Bitcoin/comments/408cof/so_can_you_make_a_complex_script_and_put_it_into/, Jan. 9, 2016 [retrieved Feb. 27, 2019], 5 pages.
Mike et al., "Contract," Bitcoin Wiki, https://en.bitcoin.it/wiki/Contract, Aug. 10, 2017 [retrieved Feb. 5, 2018], 13 pages.
Mike et al., "Contract," Bitcoin Wiki, Oct. 22, 2015 version (first disclosed May 22, 2011) [retrieved May 12, 2020], https://en.bitcoin.it/w/index.php?title=Contract&oldid=59172, 11 pages.
Morrison, "Blockchain and smart contract automation: How smart contracts automate digital business," PwC Technology Forecast, copyright 2016, https://www.pwc.com/us/en/technology-forecast/2016/blockchain/pwc-smart-contract-automation-digital-business.pdf, 8 pages.
Netizen_Cookie et al., "I recently told my boyfriend that I want to marry him without involving the state. He said yes and suggested we "put it on the blockchain" (which is, of course, how I know I picked the right one). Anyone know how to go about this via smart contracts or colored coins or something? Need specifics," https://www.reddit.com/r/Bitcoin/comments/2citbd/i_recently_told_my_boyfriend_that_i_want_to_marry/, Aug. 3, 2014 [Sep. 20, 2016], 32 bages.
Newman et al., "Contracts and Transactions," Github, Aug. 24, 2015 [retrieved Apr. 4, 2017], https://github.com/ethereum/go-ethereum/wiki/Contracts-and-Transactions, 12 pages.
Ngo, "Counterparty Announces Ethereum Virtual Machine for Smart Contracts Creation on the Bitcoin Blockchain," Coin Journal, http://coinjournal.net/counterparty-ethereum-virtual-machine-smart-contracts-bitcoinblockchain/, Jun. 8, 2016 [retrieved Sep. 20, 2016], 3 pages.
Omohundro, "Cryptocurrencies, Smart Contracts, and Artificial Intelligence," Oct. 22, 2014 (retrieved Jul. 20, 2020), https://steveomohundro.com/2014/10/, 7 pages.
Omunhundro, "Smart Contracts," Possibility Research, Oct. 26, 2014 (retrieved Jul. 20, 2020), 33 pages.
Piasecki et al., "Talk:Script," Bitcoin Wiki, https://en.bitcoin.it/wiki/Talk:Script, Dec. 20, 2011 (most recent edit Nov. 15, 2015) [retrieved Feb. 27, 2019], 2 pages.
Pyongyangpothead, "Multi-Blockchain uses?," Reddit r/ethdev, https://www.reddit.com/r/ethdev/comments/4c6xd4/multiblockchain_uses/, Mar. 27, 2016 [retrieved Feb. 27, 2019], 2 pages.
Rampton, "Detailed look at Ethereum Applications," Due, Apr. 1, 2016 [retrieved Apr. 4, 2017], https://due.com/blog/detailed-look-at-ethereum-applications/, 9 pages.
Schwartz et al., "Smart Oracles: A Simple, Powerful Approach to Smart Contracts," Codius, Jul. 17, 2014 [retrieved Feb. 5, 2018], https://github.com/codius/codius/wiki/Smart-Oracles:-A-Simple,-Powerful-Approach-to-Smart-Contracts, 13 pages.
Swanson, "Tradle," Github, https://github.com/tradle/about/wiki, Aug. 3, 2015 [retrieved Sep. 20, 2016], 4 pages.
Theymos et al., "Script," Bitcoin Wiki, http:/web.archive.org/web/20160714165653/https://en.bitcoin.it/wiki/Script, Dec. 19, 2010 (archived version Jul. 14, 2016) [retrieved Mar. 14, 2019], 8 pages.
Third-Party Submission Under 37 CFR 1.290 filed Jun. 7, 2019, U.S. Appl. No. 16/097,218, filed Oct. 26, 2018, 17 pages.
Towns, "[bitcoin-dev] Let's deploy BIP65 Checklocktimeverify!," Linux Foundation, https://lists.linuxfoundation.org/pipermail/bitcoin-dev/2015-October/011473.html, Oct. 7, 2016 [retrieved Nov. 2, 2016], 1 page.
Tual et al., "IoT Interview Series: Decentralized Smart Devices with Stephan Tual from Slock.it," Postscapes, https://www.postscapes.com/iot-voices/interviews/smart-devices-ethereum-stephan-tual/, [retrieved Feb. 27, 2019], 8 pages.
UK Commercial Search Report mailed Jun. 13, 2016, Patent Application No. 1607472.6, filed Apr. 29, 2016, 5 pages.
UK Commercial Search Report mailed Oct. 19, 2016, Patent Application No. 1607569.9, 10 pages.
UK Commercial Search Report mailed Sep. 2, 2016, Patent Application No. 1607477.5, 7 pages.
UK Commercial Search Report mailed Sep. 26, 2016, Patent Application No. 1607538.4, 7 pages.
UK IPO Search Report mailed Dec. 22, 2016, Patent Application No. GB1607472.6, 6 pages.
UK IPO Search Report mailed Dec. 22, 2016, Patent Application No. GB1607538.4, 5 pages.

(56) References Cited

OTHER PUBLICATIONS

UK IPO Search Report mailed Dec. 22, 2016, Patent Application No. GB1607569.9, 6 pages.

UK IPO Search Report mailed Dec. 9, 2016, Patent Application No. GB1607477.5, 5 pages.

Watanabe et al., "Blockchain contract: A complete consensus using blockchain," IEEE 4th Global Conference on Consumer Electronics, Oct. 27, 2015, 3 pages.

Wattenhofer, "The Science of Blockchain," CreateSpace Independent Publishing Platform, https://www.yumpu.com/en/document/view/55701791/the-science-of-the-blockchain/95, Jan. 27, 2016 [retrieved Sep. 20, 2016], 8 pages.

Wikipedia, "Fredkin gate," Wikipedia the Free Encyclopedia, Nov. 26, 2018 [retrieved Feb. 27, 2019], https://en.wikipedia.org/wiki/Fredkin_gate, 3 pages.

Wikipedia, "Smart Contracts," Wikipedia the Free Encyclopedia, Jul. 24, 2015 [retrieved Jul. 20, 2020], https://en.wikipedia.org/w/index.php?title=Smartt_contract&oldid=672866135, 4 pages.

Wildling et al., "What OPCODES are available for the Ethereum EVM?," Ethereum Stack Exchange, Jan. 20, 2016 (retrieved Jul. 20, 2020), https://ethereum.stackexchange.com/questions/119/what-opcodes-are-available-for-the-ethereum-evm, 4 pages.

Xu et al., "The Blockchain as a Software Connector," 2016 13th Working IEEE/IFIP Conference on Software Architecture (WICSA), Apr. 5, 2016, 10 pages.

Zyskind et al., "Enigma: Decentralized Computation Platform with Guaranteed Privacy," arXiv preprint arXiv:1506, Jun. 10, 2015, 14 pages.

Harding, "How do Bitcoin Miners Check for Double-Spend or Over-Spend?" https://stackoverflow.com/questions/30425272/how-do-bitcoin-miners-check-for-double-spend-or-over-spend, May 25, 2015, 2 pages.

Wang et al., "IC Card-based Bitcoin Payment Design and Implement" International Conference on Intelligent Systems Research and Mechatronics Engineering (ISRME 2015), Atlantis Press, 2015, 4 pages.

Giechaskiel, Ilias, "An Evaluation of the Effects of Broken Cryptographic Primitives on Bitcoin", University of Oxford, 2015, 20 pages.

Bitcoin, "What is Bitcoin Locking and Unlocking Script?", May 15, 2018, 4 pages.

Raj, Koshik, "Locking and Unlocking Scripts", 2023, 7 pages.

Nisan, "Boolean Logic", Jan. 1, 2008, Part of: The Elements of Computing Systems: Building a Modern Computer from First Principles, 22 pages.

Barber et al., "Bitter to Better—How to Make Bitcoin a Better Currency," International Conference on Financial Cryptography and Data Security, Feb. 27, 2012, http://elaineshi.com/docs/bitcoin.pdf, 15 pages.

Satoshi et al., "Connection Limits," Bitcoin Forum, Aug. 9, 2010, https://bitcointalk.org/index.php?topic=741.0;prev_next=prev, 2 pages.

\* cited by examiner

METHOD AND SYSTEM FOR CONTROLLING THE PERFORMANCE OF A CONTRACT USING A DISTRIBUTED HASH TABLE AND A PEER-TO-PEER DISTRIBUTED LEDGER

TECHNICAL FIELD

The present disclosure relates to methods of securing computer software and authorising access to the computer software using a distributed hash table and a peer-to-peer distributed ledger.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "user" may refer herein to a human or a processor-based resource.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

One area of current research is the use of the blockchain for the implementation of "smart contracts". These are computer programs designed to automate the execution of the terms of a machine-readable document such as a contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token which has no discernable meaning or value. The token thus serves as an identifier that allows the real-world item to be referenced from the blockchain.

These areas of technical research may be applied to advantage in respect of the control of a digital asset, such as software for example. Traditional approaches to securing the integrity and sharing of computer software involve the digital signing of the executables of the computer software. For instance, signing the executable or other associated code with a cryptographic pair of keys, such as a public key and a private key. The public key is often obtained from a trusted central authority such as a certification authority.

Computer software is often accompanied by a licence containing contractual obligations. The licence may contain the terms that govern the use or redistribution of the software. An issue may arise where the computer software or the associated licence is unlawfully transferred to another user.

Any discussion of documents, acts, materials, devices, articles or the like which have been included in the present specification is not to be taken as an admission that any or all of these matters form part of the prior art base or were common general knowledge in the field relevant to the present disclosure as it existing before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

The invention may comprise a computer-implemented control method. It may be arranged to control the performance of a computer-executed process. The process may be specified by a contract. The contract may be a smart contract, which is a machine executable document. The term "user" may be used herein to refer to a human user, or a machine (computer). Additionally or alternatively, the invention may be described as providing a security solution (method/system). It may be arranged to preserve the integrity of a controlled resource or digital asset. It may be arranged to control the transfer of a controlled resource or digital asset. The resource or asset may be software.

The method may comprise:
  storing a (smart) contract on or in a computer-based repository, the contract being associated with a first user (U1) and a second user (U2);
  receiving over a communications network, a blockchain transaction comprising at least one output and comprising a token to be transferred from an agent or a first computer (A) to the first user (U1) or the second user (U2) (wherein the second user is a second computer), the transaction comprising metadata that includes an identifier indicative of a location where the contract is stored;

querying a peer-to-peer distributed ledger to determine whether the transaction comprises at least one unspent output (UTXO); and, responsive to querying the peer-to-peer distributed ledger, determining whether to modify performance of the contract.

The unspent output (UTXO) may comprise a representation of the contract. Querying a peer-to-peer distributed ledger may comprise scanning a peer-to-peer distributed ledger (blockchain) to determine whether the transaction comprises the at least one unspent output (UTXO) representing the contract. The contract may be associated with a licence between the first and second users.

The transaction may further comprise a deterministic redeem script address. The redeem script address may be a pay-to-script-hash (P2SH) address. Thus, the existence of a contract (or defined element within a contract) may be made publicly available using a transaction which is published to the peer-to-peer distributed ledger (for example, the blockchain) using a pay-to-script-hash address which may be determined or provided by the issuer of the contract; and/or the metadata of the contract.

The step of determining may comprise terminating the contract in the event that the at least one unspent output (UTXO) cannot be identified from the peer-to-peer distributed ledger, or maintaining the contract in the event that the at least one unspent output (UTXO) is identified from the peer-to-peer distributed ledger.

The step of terminating the contract may comprise broadcasting a further transaction to spend the at least one unspent output (UTXO). In addition, in the step of broadcasting the further transaction, the further transaction may comprise an instruction to spend the at least one unspent output (UTXO) at a specified data and/or time. For example, the instruction may be a CheckLockTimeVerify instruction.

The further transaction may comprise an input which is the at least one unspent output (UTXO), and a redeem script comprising a signature, the metadata, an agent public key (PA) associated with the agent, and a first user public key (PU1) associated with the first user (U1). This provides the benefit of automated termination of the contract, and thus the licence, by implementing a transaction to spend the unspent output (UTXO) on the peer-to-peer distributed ledger.

The contract may define at least one condition, the at least one condition relating to operation of the licence as between the first user (U1) and the second user (U2), and at least one action whose performance is dependent upon the evaluation of the condition. The condition may be a test which can be evaluated to true or false. The condition may be part of (for example, a clause) the contract. Completion or performance of the condition may be required for fulfillment of the contract. The condition may be completed if it evaluates to true.

The metadata may comprise an address or representation of an address of where the contract is stored in the computer-based repository and/or a hash of the contract.

The step of querying the peer-to-peer distributed ledger may further comprise checking whether the contract has been terminated by determining whether the at least one unspent output (UTXO) is present in a list of unspent transaction outputs for the peer-to-peer distributed ledger.

The computer-based repository may be or comprise a server. The repository may be a database or storage facility provided on a computer-based resource. The Repository may be indexed, allowing it to be searched. The repository may comprise a Distributed Hash Table (DHT). The contract may be stored in or in association with the DHT.

The contract may comprise a Deterministic Finite Automation (DFA) to implement the contract. In addition, the Deterministic Finite Automation (DFA) may be defined using a codification scheme.

The method may further comprise the step of renewing the contract by performing the steps of: generating a sub-key relating to a previous key associated with the contract; generating a further redeem script comprising the sub-key, the location of the contract, and a hash of the contract; and paying a quantity of a cryptocurrency (C) to the further redeem script.

The method may further comprise the step of generating a sub-contract derived from the contract, wherein the sub-contract is associated with a deterministic address and is generated by performing the steps of: using a new public key derived using a seed; storing the sub-contract in or on the computer-based repository with a reference to the contract; broadcasting a sub-contract transaction to the peer-to-peer distributed ledger, the sub-contract transaction including the reference to the contract; and adding, to the metadata associated with the contract, a reference to the sub-contract.

The licence between the first user (U1) and the second user (U2) may relate to one or more of computer software, and digital media, including music, videos, and electronic books.

The peer-to-peer distributed ledger may be the blockchain. In addition, the cryptocurrency may be bitcoin.

The invention may also comprise a computer-implemented system arranged to perform any embodiment of the invention mentioned above.

A computer software program comprising machine-readable instructions to cause a processing device to implement the above method.

The invention may comprise a computer system corresponding to any embodiment of the method described above. The method may be arranged to control the performance of a computer-implemented process such as defined in a (smart) contract.

The system may comprise a processing device configured to: store a (smart) contract on or in a computer-based repository; the contract may be associated with a licence between a first user (U1) and a second user (U2);

receive, over a communications network, a blockchain transaction comprising at least one output and comprising a token to be transferred from an agent (A) (e.g. first computer) to a second computer (which may be the first user (U1) or the second user (U2)), the transaction comprising metadata that includes an identifier indicative of a location where the contract is stored;

query a peer-to-peer distributed ledger to determine whether the transaction comprises at least one unspent output (UTXO); and responsive to querying the peer-to-peer distributed ledger, determine whether to modify performance of the contract.

The unspent output (UTXO) may comprise a representation of the contract. Querying a peer-to-peer distributed ledger (blockchain) may comprise scanning a peer-to-peer distributed ledger (blockchain) to determine whether the transaction comprises the at least one unspent output (UTXO) representing the contract.

Any feature described above in relation to one aspect or embodiment may also be used in conjunction with any other aspect or embodiment. Any feature described in relation to a system of the invention may be applicable to the corresponding method and vice versa.

BRIEF DESCRIPTION OF DRAWINGS

FIG. 1 illustrates an example of a hash table.
Examples of the present disclosure will be described with reference to.

DESCRIPTION OF EMBODIMENTS

The present disclosure generally relates to methods and systems for utilising a distributed hash table and a peer-to-peer (P2P) distributed ledger (blockchain), such as the Bitcoin blockchain, to enable securing and authorising access to a computer software.

While embodiments described below may refer specifically to transactions that occur on the Bitcoin blockchain (referred to herein as the blockchain), it will be appreciated that the present invention may be implemented using other P2P distributed ledgers. The blockchain is used below to describe aspects of the invention for simplicity only due to its high level of standardisation and large quantity of associated public documentation.

Distributed Hash Table

In a typical client/server model a central server may be in charge of the majority of resources. This means that in the event of an attack or failure on the central server, the majority of the resources stored on the central server may be compromised. On the contrary, in a distributed model the resources are shared ("distributed") between participating nodes. In this way, the capacity of all participating nodes is utilised and the failure of one server will not compromise the majority of the resources.

Figure 1:
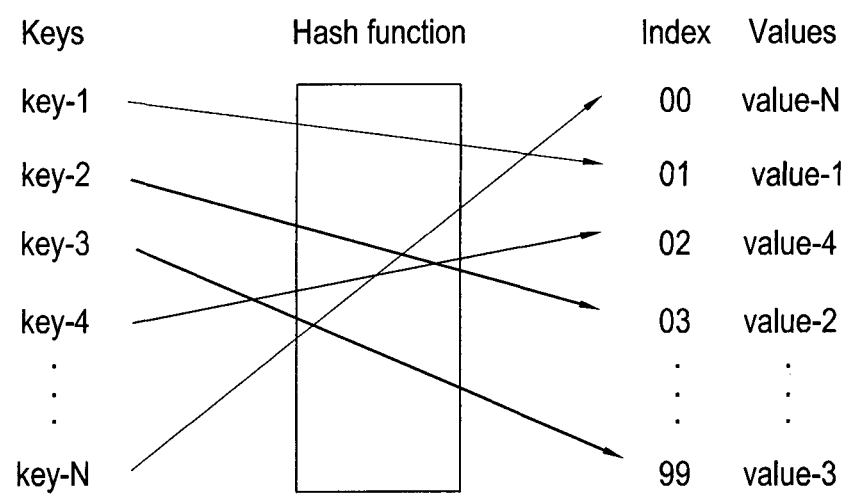

FIG. 1 illustrates an example of a hash table. The hash table is comprised of key-value pairs. The key of each key-value pair is mapped, by way of a hash function, to an index. The index defines the location of stored values of the key-value pairs.

A DHT is an example of applying the distributed model to a hash table. Similar to a hash table, a DHT comprises key-value pairs and provides an efficient method to locate ("lookup") a value of a key-value pair given just the key. However, in contrast to the hash table, the key-value pairs are distributed and stored by a number of participating nodes. In this way, responsibility for storing and maintaining the key-value pairs is shared by the participating nodes.

In the same way as a hash table, each key-value pair in the DHT is mapped to an index. The index is determined for each key-value pair by performing a hash function on the key. For example, the cryptographic Secure Hash Algorithm SHA-1 may be used to determine the index.

Each participating node is assigned at least one index by keyspace partitioning. For each index that the participating node is assigned, the participating node stores the value of that key-value pair.

It is an advantage that values of the key-value pairs may be efficiently retrieved. To retrieve a value associated with a key, a node may execute a "lookup" to determine the responsible node (via the index). The responsible node may then be accessed to determine the value.

Bitcoin and the Blockchain

As is well known in the art, the blockchain is a transaction type ledger of database where storage capacity is distributed across networked nodes participating in a system based on the Bitcoin protocol. Each Bitcoin transaction is broadcast to the network, the transactions are confirmed and then aggregated into blocks. The blocks are then included on the blockchain by storing the blocks at multiple participating nodes.

A full copy of a cryptocurrency's P2P distributed ledger contains every transaction ever executed in the cryptocurrency. Thus, a continuously growing list of transactional data records is provided. Since each transaction entered onto the blockchain is cryptographically enforced, the blockchain is hardened against tampering and revision, even by operators of the participating nodes.

Due to the transparency of the blockchain, histories are publicly available for each transaction.

It is a further advantage of the blockchain that the transaction and the record of the transaction are the same.

In this way, the information relating to the transaction is captured in the actual transaction. This record is permanent and immutable and therefore removes the requirement for a third party to keep the transaction record on a separate database.

Pay-to-Script-Hash and Multi-Signature

While embodiments below may refer specifically to transactions that use the pay-to-script-hash (P2SH) method of the Bitcoin protocol, it will be appreciated that the present invention may be implemented using another method of the Bitcoin protocol such as the pay-to-public-key-hash method.

Each transaction record on the blockchain comprises a script including information indicative of the transaction and a number of public keys. These public keys may be associated with the sender and recipient of the cryptocurrency. A script can be considered as a list of instructions recorded with each transaction record on the blockchain that describes how a user may gain access to the cryptocurrency specified in the transaction record. A script may also describe requirements for accessing the cryptocurrency, for instance, the required signatures.

As background, in a standard P2SH method of the Bitcoin protocol, the output script, or redeem script, may take the form:

<NumSigs PubK1 PubK2 . . . PubK15 NumKeys OP_CHECKMULTISIG> where NumSigs is the number "m" of valid signatures required to satisfy the redeem script to unlock the transaction; PubK1, PubK2 . . . PubK15 are the public keys that correspond to signatures that unlock the transaction (up to a maximum of 15 public keys) and NumKeys is the number "n" of public keys.

In the Bitcoin protocol, signatures based on a user's private key may be generated using the Elliptic Curve Digital Signature Algorithm. The signatures are then used for redemption of the cryptocurrency associated with the output script or redeem script. When a user redeems an output script or redeem script, the user provides their signature and public key. The output script or redeem script then verifies the signature against the public key.

To redeem the above redeem script, at least a number "m" of signatures corresponding to the public keys are required. In some examples, the order of the public keys is important and the number "m" out of "n" signatures for signing must be done in sequence. For example, consider where "m" is 2 and "n" is 15. If there are two signatures are available for use, Sig1 (corresponding to PubK1) and Sig 15 (corresponding to PubK15), the redeem script must be signed by Sig1 first followed by Sig15.

Overview of the System

Figure 2:
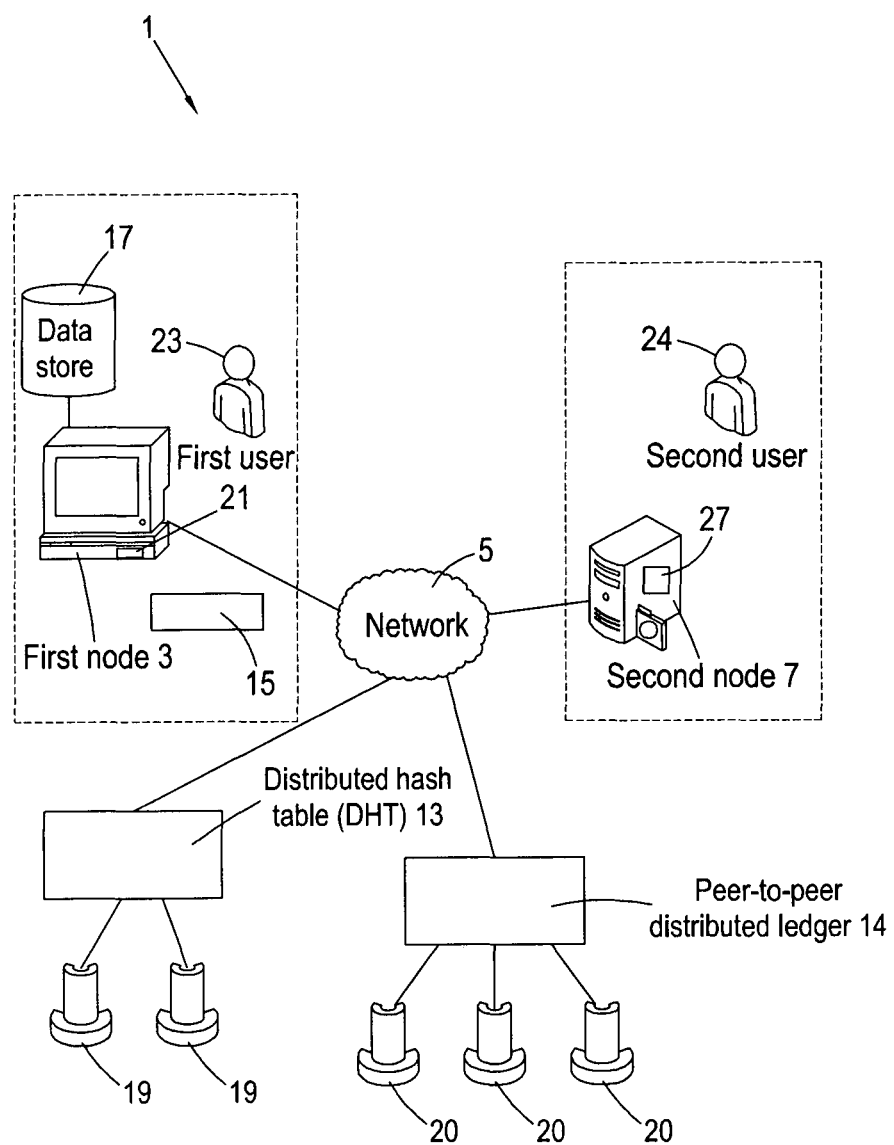
FIG. 2 illustrates a schematic diagram of an example system for determining a metadata (M) for securing computer software using a distributed hash table.

FIG. 2 illustrates a system 1 that includes a first node 3 that is in communication with, over a communications network 5, a second node 7. The first node 3 has an associated first processing device 21 and the second node 5 has an associated second processing device 27. Examples of the first and second nodes 3, 7 include an electronic device, such as a computer, tablet computer, mobile communication device, computer server etc.

A DHT 13 to record and store key-value pairs is also illustrated in FIG. 2. The DHT 13 may be associated with one or more processing devices 19 to receive, record and store the values of the key-value pairs. The processing devices 19 may be used by "participating nodes" of the DHT 13. As described above, the DHT 13 provides an efficient method to locate values of key-value pairs.

FIG. 2 also illustrates a P2P distributed ledger 14 to record transactions. The P2P distributed ledger 14 may be associated with one or more processing devices 20 to receive and record transactions. As described above, an example of a P2P distributed ledger 14 is the bitcoin blockchain. Therefore, in the context of the blockchain, the processing devices 20 associated with the P2P distributed ledger 14 may be processing devices referred to as "miners".

The first node 3 is associated with a first user 23 and the second node 7 is associated with a second user 24. In one example, the first node 3 may represent a vendor of the computer software. In another example, the first node 3 may represent an agent or service provider. In yet another example, the first node 3 may represent a user of the computer software.

Similarly, the second node 7 may represent the agent, service provider, vendor of the computer software or a user of the computer software.

Figure 3:
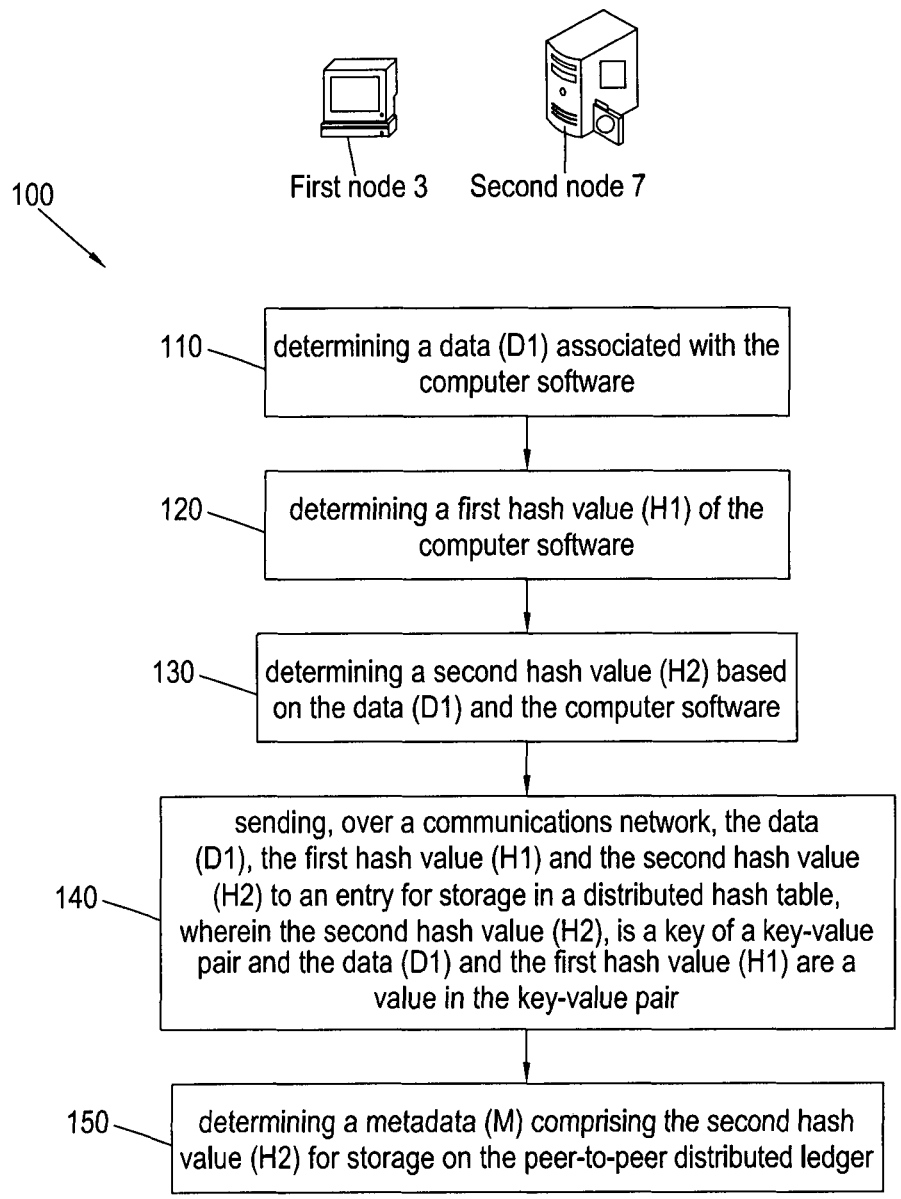
FIG. 3 illustrates a flow chart of a computer-implemented method for determining a metadata (M) for securing a computer software using a distributed hash table.
Figure 6:
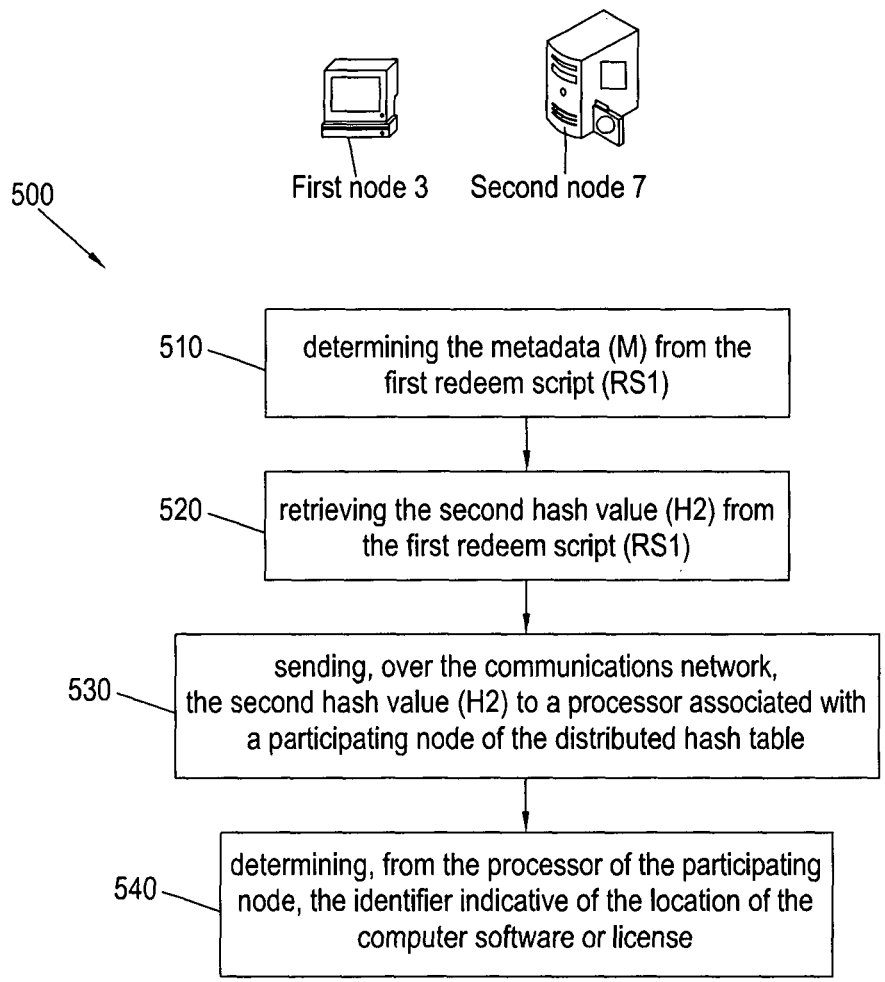
FIG. 6 illustrates a flow chart of a computer-implemented method for determining an identifier indicative of the location of a computer software using a distributed hash table.

In one example, the first node 3 performs the method 100, 500 as illustrated by FIG. 3 and FIG. 6. In another example, the second node 7 performs the method 100, 500. While the exemplary embodiments below may refer to the first node 3 as performing the methods it is to be understood the disclosure may also be adapted or modified to be performed by other nodes.

The method 100 as illustrated by FIG. 3 includes determining 110 a data (D1) associated with the computer software. The data (D1) may further comprise a licence associated with the computer software. The method 100 also includes determining 120 a first hash value (H1) based on the computer software. In one example, the first hash value (H1) may be in relation to an executable of the computer software.

The method 100 also includes determining 130 a second hash value (H2) based on the data (D1) and the computer software. In one example, the second hash value (H2) may be representative of the details of the computer software and the licence associated with the computer software. In a further example, the second hash value (H2) may comprise additional information.

The method 100 further includes sending 140, over a communications network 5, the data (D1), the first hash value (H1) and the second hash value (H2) to an entry on a distributed hash table 13, wherein the second hash value (H2) is assigned to a key of a key-value pair and the data (D1) and the first hash value (H1) are assigned to the value in the key-value pair. The value in the key-value pair may further comprise an identifier indicative of the location of the computer software or licence.

The method 100 also includes determining 150 a metadata (M) that is based on the second hash value (H2) for inclusion on the peer-to-peer distributed ledger 14. In one example, the metadata (M) may be included in a first redeem script (RS1) for inclusion on the peer-to-peer distributed ledger 14.

Determining a Data Associated with the Computer Software 110

As described above the method 100 includes determining 110 a data (D1) associated with the computer software. Determining 110 a data (D1) may comprise receiving the data (D1) from a user, node or data store. Determining 110 a data (D1) may further comprise generating the data (D1) at the first node 3.

In one example, the first node 3 may receive the data (D1) from the first user 23 via the user interface 15. In another example, the first node 3 may receive the data (D1) from the second user 24. In yet another example, the first node 3 may receive the data (D1) from a data store 17.

Data (D1) is associated with the computer software where data (D1) may identify the computer software, additional information, a licence of the computer software or be indicative of the location of the computer software. For example, the data (D1) may comprise a string or data structure that identifies the computer software. The string or data structure may comprise a collection of identifying keywords and/or additional information about the computer software. An example of additional information may be an identifier of the version of the computer software, for example a numeral. For instance, if the computer software is entitled BobSoftware and the version is 3.0, the string or data structure (D1) may comprise "BobSoftware/3.0".

In a further example, the data (D1) may comprise an identifier of a licence associated with the computer software. This may be a software licence identification number (ID) or a software licence key. In another example, the identifier of the licence may comprise a cryptographic hash of the contents of the licence.

The data (D1) may further comprise an identifier indicative of the storage location of the computer software. In one example, the identifier may comprise a URL for an object on the Internet. In a further example, a link to the storage location of the computer software on a repository such as a hash table or distributed hash table may be provided.

In yet a further example the data (D1) may comprise information that identifies the vendor of the computer software. This may include personal details such as name, address, contact details or a public key associated with the vendor.

Determining a First Hash Value (H1) Based on the Computer Software 120

As also described above the method 100 further includes determining 120 a first hash value (H1) of the computer software. Determining 120 a first hash value (H1) may comprise receiving the first hash value (H1) from a user or accessing the first hash value (H1) from a data store. Determining 120 a first hash value (H1) may further comprise calculating the hash value at the first node 3.

In one example, the first node 3 may receive the first hash value (H1) from the first user 23 via the user interface 15. In another example, the first node 3 may receive the first hash value (H1) from the second user 24. In yet another example, the first node 3 may access the first hash value (H1) from a local data store 17 or remote data store.

In one example, the first hash value (H1) is of an executable of the computer software. The executable of the computer software may be retrieved from the communications network 5 such as the Internet. In another example, the executable may be provided by the first user 23 or the second user 24. In yet another example, the executable may be retrieved from the data store 17. In yet a further example, the executable may be retrievable from a repository such as a hash table or a DHT.

The hash of the executable of the software may be determined using the SHA-256 algorithm to create a 256-bit representation of the information. It is to be appreciated that other hash algorithms may be used, including other algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may include families based on Zémor-Tillich hash function and knapsack-based hash functions.

Determining a Second Hash Value (H2) Based on the Data (D1) and the Computer Software 130

The method 100 also includes determining 130 a second hash value (H2) based on the data (D1) and the computer software.

In one example, the second hash value (H2) may be determined based on the hash of the concatenation of the data (D1) and the executable (or hash of the executable, that is, the first hash value (H1)) of the computer software. In a further example, the second hash value (H2) may be determined based on the hash of the concatenation of the data (D1), the executable (or hash of the executable) of the computer software and additional information.

Additional information may comprise a public key of the first user 23 (PU1) or second user 24 (PU2). In a further example the additional information may comprise an identifier of an entity associated with the first user 23 or second user 24. For instance, the entity may be an employer of the first user 23 or second user 24. In another example, the entity may be a service provider of the first user 23 or second user 24.

The additional information may further comprise a device identifier of a device associated with the first node 3, second node 7, first user 23 or second user 24. An example of a device is the first processing device 21 as illustrated in FIG. 2. The device identifier may comprise at least one of the following: a MAC address, motherboard serial number or a device identification number. The device identifier may further be a concatenation of at least two of the MAC address, motherboard serial number or device identification number. In a further example the device identifier may comprise a hash value associated with the MAC address, motherboard serial number or device identification number, or the concatenation described above.

In yet a further example the additional information may comprise an expiry date of the licence associated with the computer software.

Contract (e.g. Licence) Associated with the Computer Software

In a further example, the second hash value (H2) may be determined based on the concatenation of the data (D1), the executable (or hash of the executable) of the computer software, additional information or the contract (e.g. licence) that relates to the computer software.

The representation of the contract (e.g. licence) may be a file or document which specifies the content of the licence. For example, a plain ASCII text, PDF document or Word document. The second hash value (H2) may include the licence in its original form, or for example it may provide a link to the location of the licence on a publicly accessible communications network such as the Internet. In a further example, a link to the location of the licence on a repository such as a hash table or DHT may be provided. In yet a further example, a link to the location of the licence on a computer-based resource, such as the data store 17 may be provided.

In one example, the licence may comprise the first hash value (H1) associated with the computer software.

The licence associated with the computer software may further comprise additional information as described above. In one example, the licence may be associated with a first user 23 or second user 24. The licence may comprise the public key of the first user 23 (PU1) or second user 24 (PU2). In a further example the licence may comprise an identifier of an entity associated with the first user 23 or second user 24.

The licence associated with the computer software may further comprise a device identifier of a device associated with the first node 3, second node 7, first user 23 or second user 24. An example of a device is the first processing device 21 as illustrated in FIG. 2. The device identifier may comprise at least one of the following: a MAC address, motherboard serial number or a device identification number. The device identifier may further be a concatenation of at least two of the MAC address, motherboard serial number or device identification number. In a further example the device identifier may comprise a hash value associated with the MAC address, motherboard serial number or device identification number, or the concatenation described above.

The first user 23 may be the vendor of the computer software and the second user 24 may be the recipient ("end user") of the computer software. In another example the second user 23 may be the vendor of the computer software and the second user 24 may be the end user of the computer software.

In one example the licence associated with the computer software may authorise only one end user (a "single-user licence"). In a further example, the licence associated with the computer software may authorise one device of the end user (a "single-device licence"). In another example the licence associated with the computer software may authorise more than one device of the end user (a "multi-device licence").

In another example, there may be more than one end user (a "multi-user licence"). In a further example, the licence associated with the computer software may authorise one device per end user. In another example the licence associated with the computer software may authorise more than one device per end user.

In the event that the licence is associated with a first user 23 or a second user 24, the licence may comprise the first user public key (PU1) associated with the first user 23 and the second user public key (PU2) associated with the second user 24.

Merkle Tree

Figure 4:
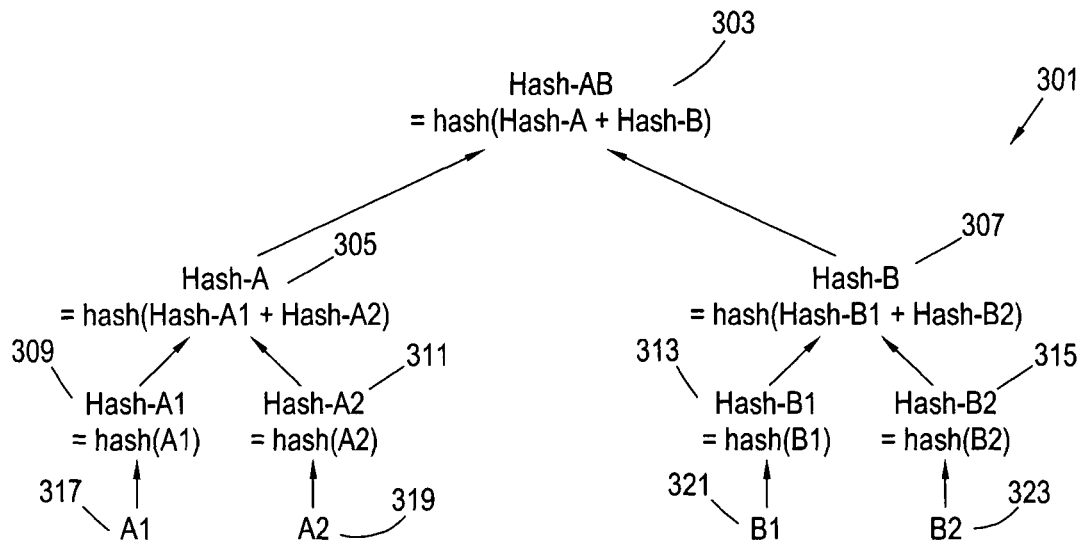
FIG. 4 illustrates an example of a Merkle tree.

In another example, the licence may be the top hash value of a Merkle tree. An example of a Merkle tree is illustrated in FIG. 4. In a Merkle tree, the hash value at each node are hashes of their respective "child" nodes. For example, the hash value Hash-A 305 is the hash of the hash values at the two "child" nodes 309 and 311. It can be seen that the top hash value of the Merkle tree, Hash-AB 303, comprises all the hash values in the Merkle tree. That is, it captures the hash values of the four "leaves" at the bottom of the tree, A1 317, A2 319, B1 321 and B2 323.

Figure 5:
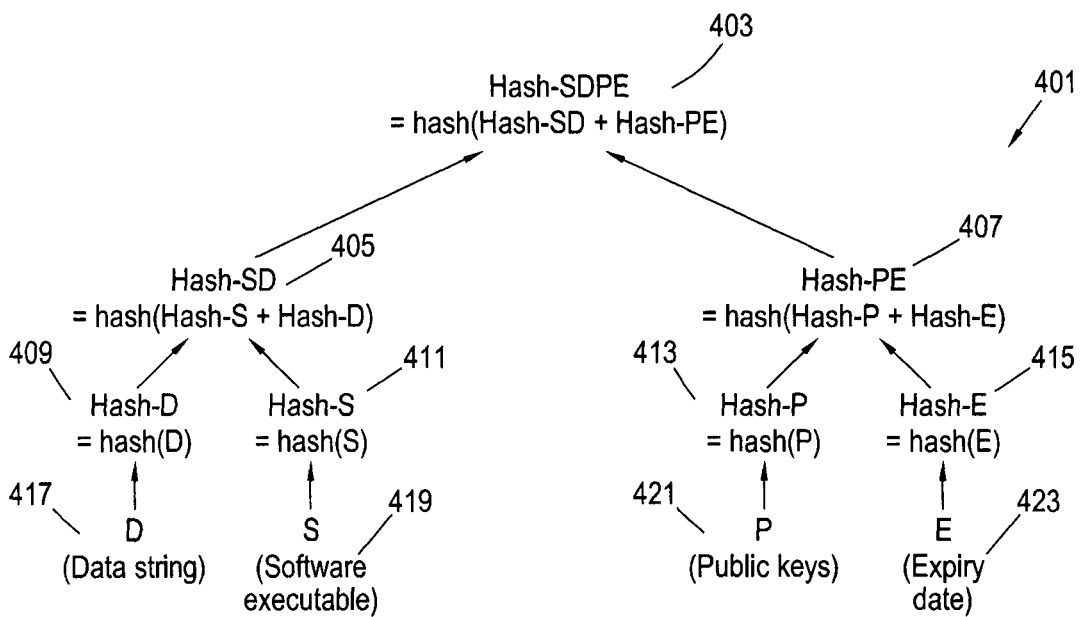
FIG. 5 illustrates an example of a Merkle tree with reference to a computer software and a licence associated with a computer software.

In an example of the present disclosure, each "leaf" of the Merkle tree may represent an aspect of the information of the licence. An exemplary licence is illustrated in FIG. 5. The data (D1) 417 is captured in the hash value Hash-D 409, the executable of the software 419 is captured in the hash value Hash-S 411 (H1), the public keys 421 of users 23 and/or 24 are captured in the hash value Hash-P 413 and the expiry date 423 is captured in the hash value Hash-E 415. It can be seen that the nodes 405 and 407 capture the hash values associated with the leaves for data (D1) 417 and software 419, and public keys 421 and expiry date 423 respectively.

It is to be appreciated that other information not otherwise described above may comprise the additional information that the hash value (H2) is based on.

Sending the Data (D1). First Hash Value (H) and Second Hash Value (H2) to a Distributed Hash Table 140

The method 100 also includes sending 140, over a communications network 5, the data (D1), first hash value (H1) and the second hash value (H2) to an entry on a distributed hash table 13.

In one example, the second hash value (H2) may be a key of a key-value pair, and the data (D1) and the first hash value (H1) may be a value in the key-value pair.

In a further example, additional information as described above may also be part of the value in the key-value pair. This includes but is not limited to: public keys of the first user 23 or second user 24, a device identifier of a device associated with the first node 3, second node 7, first user 23 or second user 24, an identifier indicative of the location of the computer software or licence, or further additional information associated with the licence.

As described above, a DHT 13 is comprised of key-value pairs, where each key-value pair is assigned to an index. In one example, the second hash value (H2) may be used to generate the index. A hash function or cryptographic hash function may be performed on the second hash value (H2). For instance, the cryptographic function SHA-1 may be used:

Index=SHA-1(H2)

For the second hash value (H2) to be the key of a key-value pair in the DHT 13, and the data (D1) and the first hash value (H1) to be the value in the key-value pair, the key and value are sent to any participating node of the DHT 13.

In one example, a message such as put (key, value) may be sent to a participating node of the DHT 13, where key is the second hash value (H2) and value is the data (D1) and the first hash value (H1). The message may be sent around all participating nodes until it is received by the participating node that is assigned to the index as indicated by the keyspace partitioning. The participating node assigned to the index indicated in the message may then store the key-value pair on the DHT 13 and assume responsibility for maintaining the entry associated with the key-value pair.

It is an advantage that the value of any given key may be retrieved from the DHT 13. In one example, the first user 23 or second user 24 may wish to retrieve the value. The first user 23 or second user 24, via the first node 3, second node 7 or another node not otherwise illustrated, may provide any participating node of the DHT 13 a request message such as get (key). The request message may then be sent around all participating nodes until it is received by the participating node that is assigned to the index as indicated by the keyspace partitioning.

Determining a Metadata (M) 150

The method 100 further includes determining 150 a metadata (M) that comprises the second hash value (H2). Determining 150 a metadata (M) may comprise receiving the metadata (M) from a user, node or data store. The metadata (M) may be included in, for example, in one or more of the 15 places available for the public keys in a P2SH multi-signature first redeem script (RS1) of a transaction on the P2P distributed ledger 14.

The first redeem script (RS1) of the transaction on the P2P distributed ledger 14 may represent an issuance, or creation, of a tokenised transaction ("issuance token") that represents the content included in the metadata (M). In one example, the token may be issued by an agent (A).

In the P2SH method of the Bitcoin protocol, metadata may be included in a redeem script by way of the method first introduced in the commonly owned British patent application number 1603125.4 entitled "Universal tokenisation system for blockchain based cryptocurrencies", the contents of which are incorporated by reference in its entirety. The process of including metadata in the redeem script is described therein. A brief summary of the process, however, is provided below.

Metadata

Metadata (M) may be embedded in one or more of the 15 places available for the public keys in a P2SH multi-signature redeem script (RS1). For example, the redeem script (RS 1) may take the form of:

<NumSigs Metadata1 Metadata2 . . . PubK1 PubK2 . . . NumKeys OP_CHECKMULTISIG> where Metadata1 and Metadata2 each include metadata that takes the place of a public key in the redeem script and PubK1 and PubK2 are public keys.

Metadata (M) may comprise the second hash value (H2). The metadata (M) may further comprise a description or keyword describing conditions associated with the computer software or licence. For example, the date of the licence, name, date of birth, address, contact details, or other details of the user associated with the licence. In a further example, information associated with the quantity of cryptocurrency may be included.

The metadata (M) may include the information in a number of ways. In one example, the contents of the information may be included. In a further example, a cryptographic hash of the information may be included. The hash of the information may be determined using the SHA-256 algorithm to create a 256-bit representation of the information. It is to be appreciated that other hash algorithms may be used, including other algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may include families based on Zémor-Tillich hash function and knapsack-based hash functions.

In further embodiments of the present disclosure, combinations including one or more of the above may be included in the metadata (M). Since the metadata (M) may be made public by way of the P2P distributed ledger 14 such as the blockchain, or transmitted over an unsecure network, it may be desirable that specific details of the metadata (M) be veiled or hidden for privacy reasons.

Therefore, the use of multi-signature P2SH Bitcoin transactions in embodiments of the present disclosure offers an advantage as it enables the transfer and permanent record of information associated with the computer software and the licence. This record is achieved by including the metadata in the output script of a transaction, for example, a redeem script.

First Redeem Script

As described above, a redeem script is an example of an output script in the standard P2SH method of the Bitcoin protocol and describes how a user may gain access to the cryptocurrency specified in the transaction record.

In the present disclosure the first redeem script (RS1) for the issuance token may be based on the metadata (M). The first redeem script (RS1) may further comprise an agent public key (PA) that forms a cryptographic pair with an agent private key (VA). In this way, the agent private key (VA) is required to "unlock" or spend cryptocurrency that is associated with the transaction.

In one example, the first redeem script (RS1) for the issuance token may include the metadata (M). The first redeem script (RS1) may further comprise an agent public key (PA). In this example, the first redeem script (RS1) may be of the form:

<OP_1 PA Metadata1 Metadata2 OP_3 OP_CHECK-MULTISIG> where OP_1 denotes the number of signatures required to satisfy the first redeem script (RS 1) to unlock the transaction ("NumSigs"), and OP_3 denotes the number of public keys in the redeem script ("NumKeys").

In this example, the first redeem script (RS1) may comprise two designated fields for the metadata, Metadata1 and Metadata2. A specific example of the Metadata1 and Metadata2 is illustrated in Table 1 below.

TABLE 1

| Field | Sub-field | Bytes | Comments |
|---|---|---|---|
| Metadata1 | LicenceType | 4 | Coded value indicates type of licence. |
| | LicencePointer | 16 | IPv6 address identifying the DHT. |
| | LicenceTypeData1 | 12 | Format depends on value of LicenceType. Padded with zeros. |
| Metadata2 | LicenceHash | 20 | RIPEMD-160(SHA256(actual licence file addressed by LicencePointer)) |
| | LicenceTypeData2 | 12 | Format depends on value of LicenceType. Padded with zeros. |

This example includes providing a pointer to the licence in Metadata1 which may be useful where the size of the licence precludes including such details in the metadata (M). Furthermore, since the metadata (M) may be made public, or transmitted over an unsecure network, it may be desirable that specific details of the token be veiled or hidden for privacy reasons.

The first 4 bytes of Metadata1 indicates the type of licence. For example, the licence type may denote the name of the computer software such as BobSoftware. In a further example the licence type may denote the authorisation type of the licence, such as "single-user" or "multi-device" as described above. The next 16 bytes holds the IP address of the location of the actual electronic licence file, making allowance for IPv6 addresses. Note that in some embodiments, this value may point to the seed of a torrent file such that the licence file can be distributed over the cloud rather than being centralised. The following 12 bytes contains data specific to the type of licence.

The first 20 bytes of Metadata2 is a hash of the actual licence file using RIPEMD-160 over SHA256 applied to the actual contents of the licence file. As the actual licence file may be retrievable this allows validation of the transaction against the contract. Note that the licence file itself may be completely public (unencrypted and human readable) or may be encrypted for privacy, depending on the requirements of the specific embodiment. The content of the remaining 12 bytes of Metadata2 may be used depending on the type of licence.

It can be seen from the example of the first redeem script (RS1) provided above that the issuance token must be signed by the agent (A) in order to be spent. An example of the transaction for the issuance token is provided in Table 2, where for brevity the miner's fee is not shown.

TABLE 2

| ID-600 | Transaction-ID |
|---|---|
| Version number | Version number |
| 1 | Number of inputs |
| ID-110 | Prev Trans Output |
| IDX-00 | Prev Trans Output index |
| Script length | Script length |
| OP_0 Sig-VA < redeem script ID-110 > | ScriptSig |
| 0000 0000 0000 0001 | Sequence number |
| 1 | Number of outputs |
| C1 | Output value |
| Output script length | Output script length |
| OP_HASH160 < hash of redeem script (RS1) > OP_EQUAL | Output script |
| LockTime | LockTime |

Lines 4 to 8 of Table 2 represent the input to the transaction which is the first quantity of cryptocurrency (C1) that is to be included in the issuance token (i.e. "tokenised"). In this example, the first quantity of cryptocurrency (C1) was the result of a previous transaction (ID-110) that transferred the first quantity of cryptocurrency to the benefit of the agent (A), and therefore the previous transaction (ID-110) output script (redeem script ID-110) includes the agent's public key (PA). Accordingly, to unlock this previous output the script (redeem script ID-110) must be signed with the first user's private key (VA). Finally, line 8 of Table 2 indicates that the first quantity of cryptocurrency (C1) will be the first output in this transaction (ID-600).

Lines 9 to 13 of Table 2 represent the first (and only) output of the transaction (ID-600), which in this case is representative of the issuance token being created and transferred back to the agent. Line 10 shows the output value, which is the first quantity of cryptocurrency (C1). Line 11 shows the output script, which includes a "<hash of redeem script>" as is used in the P2SH method of the Bitcoin protocol. In this example, the redeem script is the first redeem script (RS1) in the form as described above.

The output of the transaction (ID-600) shown in Table 2 is then recorded, with the first data output (O1), on the P2P distributed ledger 14. In particular, the first data output (O1) may comprise an indication of the first quantity of cryptocurrency (C1) that was transferred in the transaction. The first data output (O1) may further comprise a hash of the first redeem script (RS1).

In future transactions of the first quantity of cryptocurrency (C1), for example the transfer of the token to a first user 23 or second user 24, the script to unlock the first quantity of cryptocurrency (C1) (e.g. the input ScriptSig of the future transaction) may be in the form:

Sig-VA Sig-VU1<OP_1 PA PU1 Metadata1 Metadata2 OP_4 OP_CHECKMULTISIG> where Sig-VU1 indicates the signature of the first user 23. Note that the above script assumes that only one signature from the agent (A) or the first user 23 is required to unlock the first quantity of cryptocurrency (C1).

The issuance token may be transferred to another user by way of a second redeem script (RS2).

Second Redeem Script

The token that is associated with the computer software and licence may be transferred from the agent (A) to another user, for example the first user 23 or second user 24. In one example, the transfer of the token may be representative as authorising access to the user for the computer software or licence. The transfer may be implemented by a second redeem script (RS2).

In one example, the agent (A) wishes to transfer the issuance token to a first user 23. The first user 23 may represent, for example, a vendor of the computer software.

In this example, the second redeem script (RS2) may be based on the metadata (M), the agent public key (PA) associated with the agent (A) and the first user public key (PU1) associated with the first user 23.

The second redeem script (RS2) may be of the form:

<OP_1 PA PU1 Metadata1 Metadata2 OP_4 OP_CHECKMULTISIG>

In this example, the second redeem script (RS2) comprises the same two metadata fields as the first redeem script (RS1). The second redeem script (RS2) further comprises the agent public key (PA) associated with the agent and the first user public key (PU1) associated with the first user.

It can be seen from the example of the second redeem script (RS2) provided above that the token that is transferred must be signed by the agent (A) or the first user 23 in order to be spent. An example of the transaction for this transfer of the issuance token is provided in Table 3, where again for brevity the miner's fee is not shown.

TABLE 3

| ID-610 | Transaction-ID |
|---|---|
| Version number | Version number |
| 1 | Number of inputs |
| ID-600 | Prev Trans Output |
| IDX-00 | Prev Trans Output index |
| Script length | Script length |
| Sig-VA < OP_1 PA Metadata1 Metadata2 OP_3 OP_CHECKMULTISIG > | ScriptSig |
| 0000 0000 0000 0001 | Sequence number |
| 1 | Number of outputs |
| C1 | Output value |

TABLE 3-continued

| Output script length | Output script length |
|---|---|
| OP_HASH160 < hash of redeem script (RS2) > OP_EQUAL | Output script |
| LockTime | LockTime |

Similar to Table 2, lines 4 to 8 of Table 3 represent the input to the transaction (ID-610). In this example, the input is the issuance token, i.e. the output of the transaction (ID-600) that is illustrated in Table 2. It can be seen that the redeem script in line 7 corresponds to the redeem script of the issuance token, i.e. the first redeem script (RS1). Accordingly, to unlock the output of the transaction (ID-600) the first redeem script (RS1) must be signed with the agent's public key (PA).

Lines 9 to 13 of Table 3 represent the output of the transaction (ID-610), which in this case is representative of the issuance token being transferred to either the agent (A) or the first user 23 (U1). Line 10 shows the output value, which is the first quantity of cryptocurrency (C1). Line 11 shows the output script, which includes a "<hash of redeem script>" as is used in the P2SH method of the Bitcoin protocol. In this example, the redeem script is the second redeem script (RS2) in the form as described above.

The output of the transaction (ID-610) is then recorded, with a second data output (O2), on the P2P distributed ledger 14. The second data output (O2) may comprise an indication that the first quantity of cryptocurrency (C1) from the first data output (O1) is to be transferred in the transaction. The second data output (O2) may further comprise a hash of the second redeem script (RS2).

Controlling Performance of the Contract

Smart contracts built into the blockchain can be enforced through logic which is embedded directly into the Bitcoin transaction (i.e. within the locking/unlocking scripts) and/or through external computer-based applications. Such external computer-based applications which may be referred to as 'agents', 'oracles' or 'bots'. In addition, some contractual conditions can be enforced through other Bitcoin transaction elements such as the nLockTime field.

The present disclosure relates to controlling performance of a contract by providing that the contract (e.g. licence) remains in effect as long as there is a valid unspent transaction output (UTXO) on the blockchain representing the contract. It will be appreciated that this unspent state can be influenced and altered as a result of various mechanisms (e.g. a programmed computing agent) whose behaviour is controlled by conditions or stipulations in the contract itself. For example, the contract stipulates that it will expire on a certain date, or that it will expire when a certain value reaches a specified threshold.

This principle of using unspent transaction outputs to represent contracts can be used in combination with other features, such as encryption techniques. This allows the implementation of complex scenarios and activities. Effectively, the context around the unsigned transaction output UTXO and the associated metadata within the script that enables it to be spent, allows the transaction to act as a pointer or reference to an off-chain repository which contains the formal details of the contract. Here, off-chain means that it is not part of the blockchain itself. This provides a mechanism whereby anyone can determine whether the contract has been terminated or is still valid/ open by inspecting the blockchain. Once the contract is terminated, this will be recorded on the blockchain as a spent output in a transaction and this available for public inspection. The blockchain transaction becomes a permanent, unalterable and public record of the contract's existence and current status.

Figure 8:
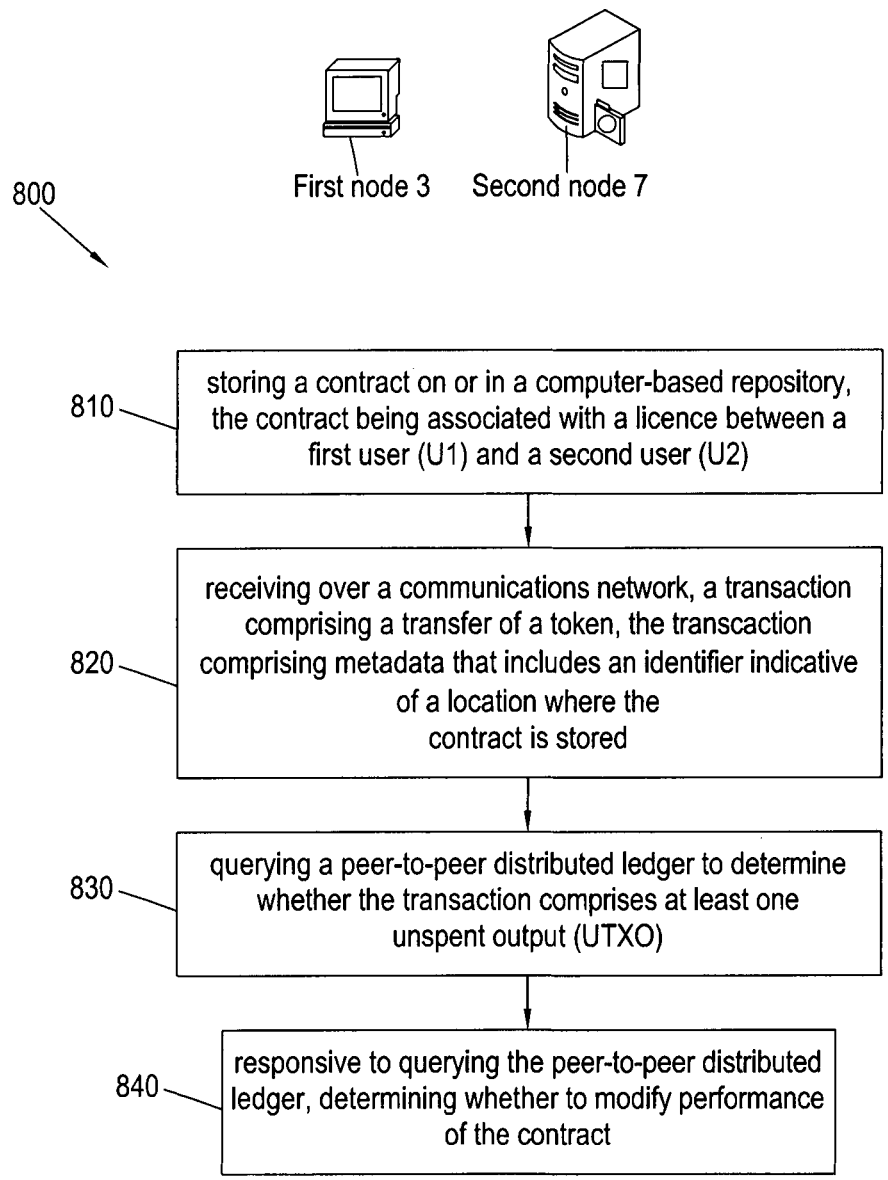
FIG. 8 illustrates a flow chart of a computer-implemented method for controlling the performance of a contract using a distributed hash table and a peer-to-peer distributed ledger.

The method 800 as illustrated by FIG. 8 includes storing 810 a contract on or in a computer-based repository, the contract being associated with a licence between a first user (U1) and a second user (U2). The computer-based repository (which may also be called a 'registry' or 'register') may be implemented in a variety of ways including, for example, as a distributed hash table (DHT). A hash of the contract (e.g. licence) can be generated and stored as metadata within the blockchain transaction, and can serve as the look-up key for referencing the contract from the blockchain. A reference to the location of the contract is also provided within the transaction metadata. For example, the URL for the repository may be provided. While the metadata is open to public view, the contract itself may not be, or may be partially protected.

Standard Bitcoin features such as CheckLockTimeVerify (CLTV) can allow the contract to have a formal, automated expiry at a point in the future. Use of the blockchain enables this expiry date to be a matter of secure (unalterable) public record. This concept, in combination with the use of multiple encryption keys described below, enables the CLTV model to automatically roll-on or renew the contract unless explicitly cancelled.

The method 800 also includes receiving 820 over a communications network, a transaction comprising a transfer of a token from an agent (A) to the first user (U1) or the second user (U2), the transaction comprising metadata that includes an identifier indicative of a location where the contract is stored;

The use of deterministic sub-keys, in combination with the tokenisation mechanism described herein, allows sub-contracts or schedules against contracts to be created.

Further still, the use of off-block computing agents (also known as 'oracles') allows contract conditionality to be built in and modified by trusted third-parties. This means that the agent's action can be influenced by conditions (e.g. "IF" statements) which are provided within the contract definition.

Key Terms

The following terms may be used herein.

Contract issuer:
This entity represents an actor that is responsible for the publication of the contract onto the blockchain Interested party:
This entity represents an actor that needs to determine whether a particular contract is still in place or not Repository:
This entity represents a location which secures/stores a structured representation of the contract that the blockchain smart contract references;

Contract counterparty:
This entity represents the counterparty to a specific contract. Note that in many cases, this entity will not be present Contract:
This is the structured document or file stored within the repository and which is referenced from the blockchain. The contract can be any type of contract or agreement. This may include, for example, financial contracts, title deeds, service contracts and more. A contract can be public or private in terms of its content. The contract is formalised in that it is expressed in a structured manner using a codification scheme.

Contract Model

The basic elements of the contract model are as follows:
A codification scheme that allows a complete description of any type of contract. The scheme may be a new construct or may use an existing facility such as XBRL, XML, JSON (etc.);
A DFA (Deterministic Finite Automaton) to implement the Contract that can be fully defined within the codification scheme. This is made up of:
  A set of parameters, and where to source those parameters;
  A set of state definitions
  A set of transitions between the states, including the trigger for the transition and the rules followed during the transition.
  Rules definition table
Definitions of the specific parameters for this instance of the Contract;
Mechanisms to secure and protect the Contract;
A 'browser' to enable the contact to be made human-readable in formal legal language; and
A 'complier' to convert the codification scheme into oracle code and/or a script such as a Bitcoin script.

Implementing the Contract

When the contract is registered in a computer-based repository, the associated address e.g. URL and hash can be used as metadata within a blockchain transaction to associate the transaction on the chain with the controlling contract itself. This can be implemented in a variety of forms, but a suitable codification scheme is provided below for completeness in the section entitled "codification Scheme".

There are a number of different methods as to how the DFA contained within the contract definition can be implemented:
  As a blockchain transaction or sequence of transactions. There are a number of separate white papers that cover how to implement various forms of DFA directly within the Bitcoin scripting language;
  As an agent-based (e.g. oracle) process or sequence of processes. The section below entitled "Illustrative Computing Agent for use with the invention" describes the basic process for defining and running a suitable agent to monitor the blockchain and possibly other external sources.
  As a set of instructions for a smart Wallet. In this content, a smart wallet is effectively simply a local oracle process which can handle certain contract conditions such as assignment of transaction inputs to a blockchain transaction.

Note that a given contract definition can be implemented as a mixture of the above three mechanisms, where each contract state transition is effectively a separate implementation. There are a number of methods of creating the implementation from a contract definition, including hand-crafting the relevant transactions/code.

Publishing the Contract's Existence

In order to publish the existence of a contract (or a defined element within a contract) a transaction (involving a transfer of a token from an agent (A) to the first user (U1) or the second user (U2)) is published to the blockchain using a pay-to-script-hash address (P2SH). A P2SH transaction is one in which the recipient must provide a script which matches the script hash, and also data which makes the script evaluate to true, in order for the transaction to be spent. In relation to embodiments of the present disclosure, the pay-to-script-hash (P2SH) can be readily determined from the issuer of the contract (e.g. the first user (U1) or second user (U2), and the metadata of the contract.

Whilst this output remains within the UTXO list on the blockchain (i.e. the transaction is still unspent), this indicates the validity of the contract contained within the metadata itself. The contract is considered to be complete once this output is spent.

Sub-Contracts/Conditions

A sub-contract is a contract that it directly related to an existing contract. A condition is a clause within an existing contract that must be publicly fulfilled to meet the terms of that contract. In accordance with an embodiment of the present disclosure, both sub-contracts and conditions can be implemented in the same manner i.e. as a contract which is implemented as an UTXO with a deterministic redeem script address. In both cases, the entity is considered complete when the UTXO is spent (in the case of a condition, this indicates that the condition has been satisfied).

There are a number of mechanisms which can be used to create the deterministic address for a condition or sub-contract:

deriving a new public key using seed information;
creating and publishing the sub-contract, with a reference to the master contract, within the repository and using this as the metadata reference; and
adding the condition/sub-contract reference to the metadata of the existing contract.

Securing the Contract

The formal representation of the contract (i.e. the document or file which specifies the content of the contract) can be secured in various ways depending on the formal needs of that specific contract, although in all cases a public record of the existence of the contract will be published on the blockchain contained within the metadata record (see section entitled "codification Scheme" for details of a specific metadata structure).

From this blockchain record, authorised entities will be able to learn the location of the formal representation, together with the hash to determine that the formal representation has not been modified since the transaction was published.

However, it is possible to further secure the formal representation itself through a number of methods:

The document repository itself can present access control mechanisms; and
The Contract itself can be secured through standard encryption techniques limiting access to those entities with access to the relevant decryption keys.

Terminating the Contract

As the blockchain provides a permanent, unalterable record of transactions, a contract cannot be terminated by simply removing the associated Contract document. This means that the secure contract repository must have the same storage and retention rules as the blockchain itself which is supported through a number of standard mechanisms. This means that the solution must present a mechanism for detecting the expiry of a contract through the blockchain record directly.

This is handled through the spending of the UTXO that represents the contract. For a number of contract types, the expiry of the contract can be published simultaneously with the publication of the Contract itself. Effectively two transactions are created, one to publish the contract and get the transaction output representing the contract and a second one to spend that output. This second transaction has a CheckLockTimeVerify set on it to spend the output on a given future date (representing the end of the contract).

This auto-spending can be extended to support the rolling-on of a contract (for example contracts that automatically extend for a further twelve months if they are not cancelled). In this situation, the UTXO is spent sending it to the 'new' rolled-on contract.

The method 800 also includes querying 830 a peer-to-peer distributed ledger to determine whether the transaction comprises at least one unspent output (UTXO). This process for querying the peer-to-peer distributed ledger involves checking the blockchain to confirm whether the UTXO relating to the contract has been spent or not. Where the UTXO is still unspent, then the contract remains valid. Where the UTXO is still unspent, but there is a/locktime transaction pending, then this will determine the expiry time for the contract. Where the UTXO is spent, then the contract has been completed in some regard.

The process of querying 830 the peer-to-peer distributed ledger assumes that an interested party (e.g. the agent, or the first party (U1) or second party (U2)) is aware of the transaction that governs the contract through some other route (in general, that is that they are either the Contract Issuer or the Contract Counterparty). However, any entity that has access to the Contract Document and knowledge of the Contract Issuer will be able to check by:

Deriving the redeem script for the UTXO transaction; and
Scanning the blockchain to find a UTXO with that matching redeem script hash.

In an alternate embodiment of the present disclosure the step of querying 830 the peer-to-peer distributed ledger is performed as part of an automated polling process, whereby the blockchain is scanned at predetermined time intervals in order to determine whether the transaction comprises at least one unspent output (UTXO) (i.e. to determine whether the transaction remains unspent).

The method 800 also includes, responsive to querying the peer-to-peer distributed ledger, determining 840 whether to modify performance of the contract. The step of determining 840 comprises either terminating the contract in the event that the at least one unspent output (UTXO) cannot be identified from the peer-to-peer distributed ledger, or maintaining the contract in the event that the at least one unspent output (UTXO) is identified from the peer-to-peer distributed ledger. It should be appreciated that the step of determining 840 may form part of an automated process. For example, a particular licence for a computer software may require payments on a regular basis (e.g. monthly or annually) or be designed to run only at certain times. In each case, the software must be able to poll the peer-to-peer distributed ledger and act accordingly (e.g. request a payment from the user in order to maintain an active licence to the computer software). It may also be possible to have the software's ability to run conditional on other external conditions, in which case the software can poll an oracle. If regional lockout (i.e. geographical activation restriction) is required, then the user's IP address can be hashed and used to create another field in the distributed hash table.

Alternatively, or in addition, the licence may be due to expire on a given date, in which case the contract transaction may be formulated such that it is spendable by the oracle's (or agent's (A)) signature, and another transaction is formulated with a locktime set to the expiry date, automatically paying the unspent output (UTXO) of the transaction back to the oracle (or agent (A)).

In the event that the at least one unspent output (UTXO) cannot be identified from the peer-to-peer ledger, a Contract Issuer (e.g. the agent, or vendor) or Contract Counterparty (e.g. licensee) may wish to close an existing contract (i.e. terminate a licence for, for example, computer software). The instigator of the closure (in most cases, the vendor of the computer software, or the agent (A) on the vendor's behalf) will check the blockchain to determine whether the contract has been cancelled or not by validating whether the previous UTXO has been spent or not (in accordance with step 830 of the method 800). If it has been spent, the process ends as the contract has already been closed. However, it should be appreciated that if the at least one unspent output (UTXO) cannot be identified from the peer-to-peer ledger, the user (e.g. the licensee) may be connected to the vendor's server via the distributed hash table (DHT) and given the opportunity, for example, to pay to renew the licence.

If there is an existing closure transaction, then the instigator will simply sign this transaction and submit onto the blockchain. If there is not an existing closure transaction, then the instigator will create the transaction with the transaction input being the UTXO of the last contract, and the unlock script being their signature, the metadata associated with the contract and their public key.

At the point that the transaction is accepted onto the blockchain then it will be public knowledge that the contract has been closed (although only the participants will know the specific reason why).

An example of the transaction for terminating the contract (e.g. licence) by spending the at least one unspent output (UTXO) is provided in Table 4, where again for brevity the miner's fee is not shown.

TABLE 4

| | |
|---|---|
| ID-620 | Transaction-ID |
| Version number | Version number |
| 1 | Number of inputs |
| ID-610 | Prev Trans Output |
| IDX-00 | Prev Trans Output index |
| Script length | Script length |
| Sig-VA < OP_1 PA PU1 Metadata1 Metadata2 OP_4 OP_CHECKMULTISIG > | ScriptSig |
| 0000 0000 0000 0001 | Sequence number |
| 1 | Number of outputs |
| C1 | Output value |
| Output script length | Output script length |
| OP_DUP OP_HASH160 < hash of agent public key (PA) > OP_EQUALVERIFY OP_CHECKSIG | Output script |
| | LockTime |

Similar to Table 3, lines 4 to 8 of Table 3 represent the input to the transaction (ID-610). In this example, the input is the 1-of-4 multisignature P2SH transaction, i.e. the output of the transaction (ID-610) that is illustrated in Table 3. It can be seen that the redeem script in line 7 corresponds to the redeem script of the 1-of-4 multisignature P2SH transaction, i.e. the second redeem script (RS2). Accordingly, to unlock the output of the transaction (ID-610) the second redeem script (RS2) must be signed with either the agent's public key (PA) or the first user's public key (PU1).

Lines 9 to 13 of Table 3 represent the output of the transaction (ID-620), which in this case is representative of the unspent output (UTXO) being spent (i.e. an amount of the cryptocurrency (C1) being paid back to the agent (A) or oracle. Line 10 shows the output value, which is the first quantity of cryptocurrency (C1).

Identifier Indicative of the Location of the Computer Software or Licence

As described above the data (D1) or licence may comprise an identifier indicative of the location of the computer software or licence respectively.

In one example, the identifier may be determined independently to the data (D1) or the licence and remain separate to the data (D1) or licence. The identifier may further be assigned to the value of the key-value pair together with the data (D1) and the first hash value (H1) as described in the method 100 above. In this way, the identifier may be included in the value field of the message put (key, value) and sent to a participating node in the DHT 13, as described above.

In one example, the identifier indicative of the location may comprise a URL for an object on the Internet. In another example, the identifier indicative of the location may comprise an address for a repository such as a hash table or a DHT 13. In yet another example, the identifier indicative of the location may comprise an address for a computer-based repository such as a server, database or storage facility provided on a computer-based resource, such as the data store 17 associated with the first processing device 21 of the first node 3.

FIG. 6 illustrates a method 500 for determining location of the computer software or licence. The method 500 includes determining 510 the metadata (M) from the first redeem script (RS1). As described above, the metadata (M) may be embedded in one or more of the 15 places available for the public keys in the first redeem script (RS1).

In the P2SH method of the Bitcoin protocol, when the output of a transaction is spent in a subsequent transaction, the redeem script becomes visible in the subsequent transaction. As described above and with reference to Table 2, the transaction (ID-600) for the issuance token is paid back to the agent (A). In this way, the agent (A) may spend this issuance token to expose the first redeem script (RS1). The metadata (M) that is based on the second hash value (H2) is therefore visible on the P2P distributed ledger 14. In this way, the second hash value (H2) is able to be retrieved 520 from the metadata (M) in the first redeem script (RS1). In one example, the value associated with the key of the key-value pair is able to be retrieved from the DHT 13 using the request message get (key).

The method 500 further includes sending 530, over a communications network 5, the second hash value (H2) to a processor associated with a participating node of the DHT 13. As described above, the second hash value (H2) may be the key of the key-value pair. As also described above, the value for a given key may be retrieved by providing a message containing the key to any participating node of the DHT 13. Therefore, in the example where the identifier is included in the value field of the key-value pair, the method 500 is able to determine 540, from the processor of the participating node, the identifier indicative of the location of the computer software or licence.

Processing Device

As noted above, the first 3 and second node 7 may be an electronic device, such as a computer, tablet computer, mobile communication device, computer server etc. The electronic device may include a processing device 21, 27, a data store 17 and a user interface 15.

Figure 7:
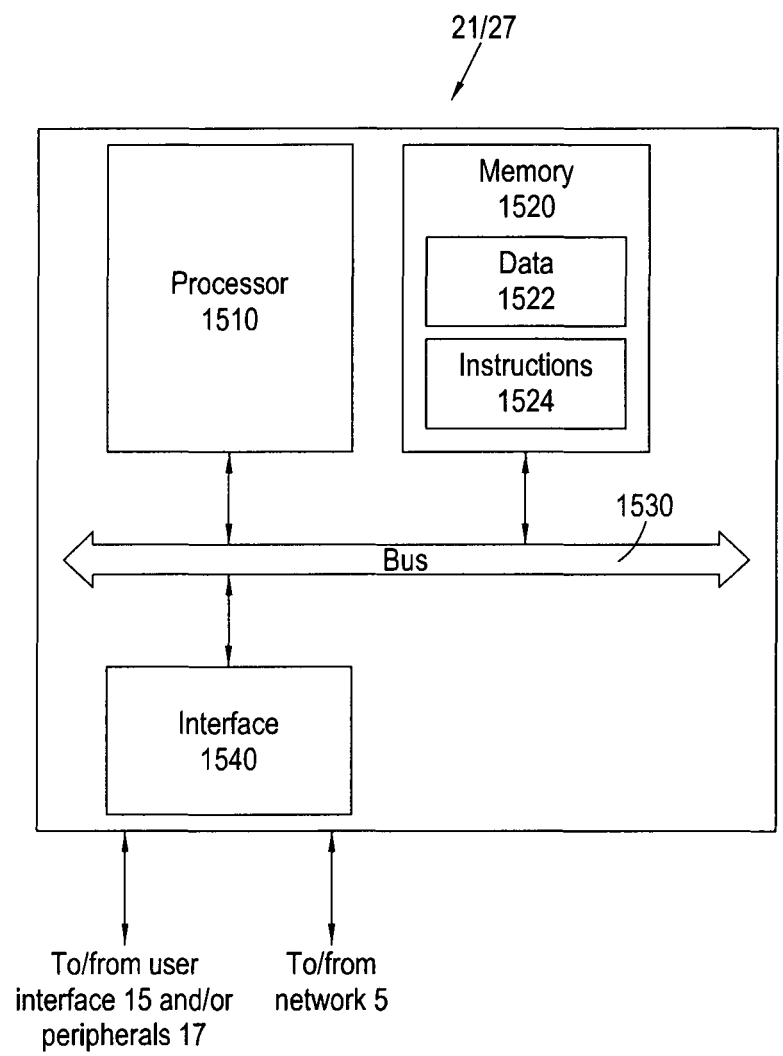
FIG. 7 illustrates a schematic of an example processing device.

FIG. 7 illustrates an example of a processing device 21, 27. The processing device 21, 27 may be used at the first node 3, second node 7 or other nodes not otherwise illustrated. The processing device 21, 27 includes a processor 1510, a memory 1520 and an interface device 1540 that communicate with each other via a bus 1530. The memory 1520 stores a computer software program comprising machine-readable instructions and data for implementing the method 100 and 500 described above, and the processor 1510 performs the instructions from the memory 1520 to implement the method 100 and 500. The interface device 1540 may include a communications module that facilitates communication with the communications network 5, and in some examples, with the user interface 15 and peripherals such as data store 17. It should be noted that although the processing device 1510 may be an independent network element, the processing device 1510 may also be part of another network element. Further, some functions performed by the processing device 1510 may be distributed between multiple network elements. For example, the first node 3 may have multiple processing devices 21 to perform method 100, 500 in a secure local area network associated with the first node 3.

Where this disclosure describes that a user, employer, employee, issuer, merchant, provider or other entity performs a particular action (including signing, issuing, determining, calculating, sending, receiving, creating etc.), this wording is used for the sake of clarity of presentation. It should be understood that these actions are performed by the computing devices operated by these entities.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method for controlling the performance of a contract, the method implemented by a processing resource, the method comprising:
    storing a contract in a Distributed Hash Table (DHT) comprising a plurality of key-value pairs, the contract being associated with a contract of computer software between a first user (U1) and a second user (U2),
    determining, by the processing resource, a key and a key value pair based on the computer software and the contract;
    receiving at the processing resource over a communications network, a transaction comprising a transfer of a token from an agent (A) to the first user (U1) or the second user (U2), the transaction comprising metadata that includes an identifier indicative of a location in the DHT where the contract is stored;
    querying, by the processing resource, a peer-to-peer distributed ledger to determine whether the transaction comprises at least one unspent output (UTXO) wherein querying a peer-to-peer distributed ledger comprises scanning the peer-to-peer distributed ledger to identify the at least one unspent output (UTXO) to determine whether the at least one unspent output (UTXO) has been spent or not; and
    modifying, by the processing resource, performance of the contract, wherein the modifying comprises:
    terminating the contract in the event that the at least one unspent output (UTXO) cannot be identified from the peer-to-peer distributed ledger, or
    maintaining the contract in the event that the at least one unspent output (UTXO) is identified from the peer-to-peer distributed ledger, wherein the step of terminating the license comprises broadcasting a further transaction to spend the at least one unspent output (UTXO), wherein in the step of broadcasting the further transaction, the further transaction comprises an instruction to spend the at least one unspent output (UTXO) at a specified date and/or time, wherein the further transaction comprises:
        an input that spends the at least one unspent output (UTXO); and
        a redeem script comprising a signature, the metadata, an agent public key associated with the agent, and a first user public key associated with the first users.

2. The method of claim 1, wherein the transaction further comprises a deterministic redeem script address.

3. The method of claim 2, wherein the redeem script address is a pay-to-script-hash (P2SH) address.

4. The method according to claim 1, wherein the contract defines:
    at least one condition, the at least one condition relating to operation of the contract as between the first user (U1) and the second user (U2); and
    at least one action whose performance is dependent upon the evaluation of the condition.

5. The method according to claim 1, wherein the metadata comprises:
    an address or representation of an address of where the contract is stored in the computer-based repository; and/or
    a hash of the contract.

6. The method according to claim 1, wherein the step of querying the peer-to-peer distributed ledger further comprises:
    checking whether the contract has been terminated by determining whether the at least one unspent output (UTXO) is present in a list of unspent transaction outputs for the peer-to-peer distributed ledger.

7. The method according to claim 1, wherein the contract comprises a Deterministic Finite Automation (DFA) to implement the contract.

8. The method according to claim 7, wherein the Deterministic Finite Automation (DFA) is defined using a codification scheme.

9. The method according to claim 1, further comprising the step of renewing the contract by performing the steps of:
    generating a sub-key relating to a previous key associated with the contract;
    generating a further redeem script comprising the sub-key, the location of the contract, and a hash of the contract; and
    paying a quantity of a cryptocurrency (C) to the further redeem script.

10. The method according to claim 1, further comprising the step of generating a sub-contract derived from the contract, wherein the sub-contract is associated with a deterministic address and is generated by performing the steps of:
    using a new public key derived using a seed;
    storing the sub-contract in or on the computer-based repository with a reference to the contract;
    broadcasting a sub-contract transaction to the peer-to-peer distributed ledger, the sub-contract transaction including the reference to the contract; and
    adding, to the metadata associated with the contract, a reference to the sub-contract.

11. The method of claim 1, wherein the contract between the first user (U1) and the second user (U2) relates to one or more of:
    the computer software; and
    digital media, including music, videos, and electronic books.

12. The method of claim 1, wherein the peer-to-peer distributed ledger is a blockchain.

13. The method of claim 9, wherein the cryptocurrency is bitcoin.

14. A non-transitory computer-readable storage medium comprising machine-readable instructions which, when executed by a processing device, cause the processing device to:
- store a contract in a Distributed Hash Table (DHT) comprising a plurality of key-value pairs, the contract being associated with a contract for computer software between a first user (U1) and a second user (U2),
- determining, by the processing resource, a key and a key value pair based on the computer software and the license;
- receive at the processing device over a communications network, a transaction comprising a transfer of a token from an agent (A) to the first user (U1) or the second user (U2), the transaction comprising metadata that includes an identifier indicative of a location in the DHT where the contract is stored;
- query, by the processing device, a peer-to-peer distributed ledger to determine whether the transaction comprises at least one unspent output (UTXO) wherein querying a peer-to-peer distributed ledger comprises scanning the peer-to-peer distributed ledger to identify the at least one unspent output (UTXO) to determine whether the at least one unspent output (UTXO) has been spent or not; and
- modifying, by the processing device, performance of the contract, wherein the modifying comprises:
  - terminating the contract in the event that the at least one unspent output (UTXO) cannot be identified from the peer-to-peer distributed ledger, or
  - maintain the contract in the event that the at least one unspent output (UTXO) is identified from the peer-to-peer distributed ledger, wherein the step of terminating the license comprises broadcasting a further transaction to spend the at least one unspent output (UTXO), wherein in the step of broadcasting the further transaction, the further transaction comprises an instruction to spend the at least one unspent output (UTXO) at a specified date and/or time, wherein the further transaction comprises:
    - an input that spends the at least one unspent output (UTXO); and
    - a redeem script comprising a signature, the metadata, an agent pubic key associated with the agent, and a first user public key associated with the first user.

15. A computer system for controlling the performance of a contract, the system comprising a processing device configured to:
- store a contract in a Distributed Hash Table (DHT) comprising a plurality of key-value pairs, the contract being associated with a contract of computer software between a first user (U1) and a second user (U2),
- determining, by the processing resource, a key and a key value pair based on the computer software and the contract;
- receive, over a communications network, a transaction comprising a transfer of a token from an agent (A) to the first user (U1) or the second user (U2), the transaction comprising metadata that includes an identifier indicative of a location in the DHT where the contract is stored;
- query a peer-to-peer distributed ledger to determine whether the transaction comprises at least one unspent output (UTXO); and
- modifying performance of the contract, wherein the modifying comprises:
  - terminating the contract in the event that the at least one unspent output (UTXO) cannot be identified from the peer-to-peer distributed ledger, or
  - maintain the contract in the event that the at least one unspent output (UTXO) is identified from the peer-to-peer distributed ledger, wherein the step of terminating the license comprises broadcasting a further transaction to spend the unspent output (UTXO), wherein in the step of broadcasting the further transaction, the further transaction comprises an instruction to spend the at least one unspent output (UTXO) at a specified date and/or time, wherein the further transaction comprises:
    - an input that spends the at least one unspent output (UTXO); and
    - a redeem script comprising a signature, the metadata, an agent public key associated with the agent, and a first user public key associated with the first user.

* * * * *